US012634831B2

(12) United States Patent
Go et al.

(10) Patent No.: US 12,634,831 B2
(45) Date of Patent: May 19, 2026

(54) METHOD FOR TRANSMITTING AND RECEIVING UPLINK SIGNAL IN WIRELESS COMMUNICATION SYSTEM, AND DEVICE FOR SAME

(71) Applicant: LG ELECTRONICS INC., Seoul (KR)

(72) Inventors: Seongwon Go, Seoul (KR); Jiwon Kang, Seoul (KR); Haewook Park, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

(21) Appl. No.: 18/258,025

(22) PCT Filed: Dec. 28, 2021

(86) PCT No.: PCT/KR2021/020030
§ 371 (c)(1),
(2) Date: Jun. 16, 2023

(87) PCT Pub. No.: WO2022/145959
PCT Pub. Date: Jul. 7, 2022

(65) Prior Publication Data
US 2024/0064649 A1 Feb. 22, 2024

(30) Foreign Application Priority Data
Dec. 29, 2020 (KR) ........................ 10-2020-0186336

(51) Int. Cl.
 *H04W 52/14* (2009.01)
 *H04W 52/08* (2009.01)
 *H04W 52/24* (2009.01)

(52) U.S. Cl.
 CPC ......... *H04W 52/146* (2013.01); *H04W 52/08* (2013.01); *H04W 52/242* (2013.01)

(58) Field of Classification Search
 CPC .............. H04W 52/146; H04W 52/08; H04W 52/242; H04W 52/262; H04W 72/231; H04L 5/0048; H04L 5/0094; H04L 5/0091
 See application file for complete search history.

(56) References Cited

U.S. PATENT DOCUMENTS

2023/0028861 A1* 1/2023 Yao ................... H04W 52/0258
2023/0379902 A1* 11/2023 Matsumura .......... H04B 7/0695

FOREIGN PATENT DOCUMENTS

CN            111901020        11/2020
KR     10-2020-0110348         9/2020
WO        2020-246819        12/2020

OTHER PUBLICATIONS

LG Electronics: "Feature lead summary#2 of Enhancements on Multi-beam Operations", 3GPP Draft; R1-1913322, 3rd Generation Partnership Project (3GPP), Nov. 2019 (Nov. 25, 2019) (hereinafter "LG") (Year: 2019).*

(Continued)

*Primary Examiner* — Umair Ahsan
(74) *Attorney, Agent, or Firm* — LEE, HONG, DEGERMAN, KANG & WAIMEY

(57) ABSTRACT
A method of a user equipment for transmitting an uplink signal in a wireless communication system is disclosed. The method comprises receiving configuration information related to a plurality of transmission configuration indication (TCI) states, and transmitting the uplink signal based on a specific TCI state among the plurality of TCI states. The specific TCI state includes at least one of i) a reference RS used for an uplink transmission or ii) a reference RS commonly used for the uplink transmission and a downlink reception. A transmission power of the uplink signal is (Continued)

determined based on the specific TCI state, and the specific TCI state is related to one or more power control parameters for determining the transmission power of the uplink signal.

12 Claims, 11 Drawing Sheets

(56)                    References Cited

OTHER PUBLICATIONS

PCT International Application No. PCT/KR2021/020030, International Search Report dated Mar. 25, 2022, 5 page.
Moderator (Samsung), "Moderator summary for multi-beam enhancement: proposal categorization," R1-2006985, 3GPP TSG RAN WG1 #102-e, e-Meeting, Aug. 2020, 27 pages.
LG Electronics, "Feature lead summary#2 of Enhancements on Multi-beam Operations," R1-1913322, 3GPP TSG RAN WG1 Meeting #99, Nov. 2019, 38 pages.
3rd Generation Partnership Project, "Technical Specification Group Radio Access Network; NR; User Equipment (UE) radio access capabilities (Release 16)," 3GPP TS 38.306 V16.2.0, Sep. 2020, 126 pages.
European Patent Office Application Serial No. 21915757.5, Search Report dated Oct. 28, 2024, 13 pages.

* cited by examiner

Antenna port A ⎱ Numerology X
Antenna port B ⎰

Antenna port A ⎱ Numerology Y
Antenna port B ⎰

| INITIAL CELL SEARCH | SYSTEM INFORMATION RECEPTION | RANDOM ACCESS PROCEDURE | | | | GENERAL DL/UL Tx/Rx | |
|---|---|---|---|---|---|---|---|
| PSS/SSS& [DLRS]& PBCH | PDCCH/ PDSCH (BCCH) | PRACH | PDCCH/ PDSCH | PUSCH | PDCCH/ PDSCH | PDCCH/ PDSCH | PUSCH/ PUCCH |
| S601 | S602 | S603 | S604 | S605 | S606 | S607 | S608 |

· DL/UL ACK/NACK
· UE CQI/PMI RI REPORT
  USING PUSCH AND PUCCH (a)　　　　　　　　　　　　　　　　(b)

<u>1000 (102/106, 202/206)</u>

(100, 200)

| | |
|---|---|
| Device | |
| 110 — Communication unit (e.g., 5G communication unit) | Control unit (e.g., processor(s)) — 120 |
| 112 — Communication circuit (e.g., processor(s), memory(s)) | Memory unit (e.g., RAM, storage) — 130 |
| 114 — Transceiver(s) (e.g., RF unit(s), antenna(s)) | Additional components (e.g., power unit/battery, I/O unit, driving unit, computing unit) — 140 |

METHOD FOR TRANSMITTING AND RECEIVING UPLINK SIGNAL IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2021/020030, filed on Dec. 28, 2021, which claims the benefit of earlier filing date and right of priority to Korean Application No. 10-2020-0186336, filed on Dec. 29, 2020, the contents of which are all hereby incorporated by reference herein in their entireties.

TECHNICAL FIELD

The present disclosure relates to a method of transmitting and receiving an uplink signal in a wireless communication system and a device therefor.

BACKGROUND

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

According to the existing scheme (e.g., Rel-15/16 NR), an uplink (UL) power control behavior is specifically defined to channel/reference signal (RS) (channel/RS specific UL power control). According to the above behavior, there is a problem in that not only the mathematical definition but also a method of configuring/activating power control parameters are different for each channel/RS. Specifically, 1) in a physical uplink shared channel (PUSCH), a power control (PC) parameter set is mapped to a codepoint of a Sounding reference signal Resource Indicator (SRI), 2) in a physical uplink control channel (PUCCH), a PC parameter set is mapped to each PUCCH resource through spatial relation information activation (spatialRelationInfo activation), and 3) in a sounding reference signal (SRS), a PC parameter set is configured in units of SRS resource set (via RRC).

SUMMARY

Based on newly introduced i) TCI state (DL/UL joint TCI state) that can be commonly used for downlink and uplink, and ii) uplink (UL) TCI state, a beam may be commonly indicated regardless of a type of channel/reference signal. Accordingly, it may be inefficient for the power control behavior to be always performed based on the type of channel/reference signal.

The present disclosure provides a method for solving problems of the existing power control scheme described above.

In addition, when a pathloss reference signal (PL RS) set associated with a TCI state (or TCI state pool) newly introduced in addition to a PL RS set configured for each UL channel/RS for power control is separately defined/configured, the following problem may occur. Specifically, the UE can track up to four PL RSs per cell based on UE performance. However, there is a problem that whether this restriction is applied only to the existing PL RS or applied to a newly defined PL RS is ambiguous from a UE behavior perspective.

The present disclosure provides a method for resolving ambiguity in a UE behavior related to the above-described power control.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

In one aspect of the present disclosure, there is provided a method of a user equipment (UE) for transmitting an uplink signal in a wireless communication system, the method comprising receiving configuration information related to a plurality of transmission configuration indication (TCI) states, and transmitting the uplink signal based on a specific TCI state among the plurality of TCI states.

The specific TCI state includes at least one of i) a reference RS used for an uplink transmission or ii) a reference RS commonly used for the uplink transmission and a downlink reception.

A transmission power of the uplink signal is determined based on the specific TCI state, and the specific TCI state is related to one or more power control parameters for determining the transmission power of the uplink signal.

The one or more power control parameters may include at least one of P0, alpha, a path-loss reference RS (PL RS), or a closed-loop index.

A first specific power control parameter applied as a different value based on a type of the uplink signal may be excluded from the one or more power control parameters, and the first specific power control parameter may be the P0.

The one or more power control parameters may include only a second specific power control parameter equally applied based on a type of the uplink signal. The second specific power control parameter may be based on at least one of the alpha, the PL RS or the closed-loop index.

The method may further comprise receiving a downlink reference signal (DL RS), and measuring a path loss based on the DL RS. The transmission power of the uplink signal may be determined based on the one or more power control parameters and the path loss.

The DL RS may be based on one or more PL RSs that can be maximally tracked by the UE for the measurement of the path loss.

The one or more PL RSs may be related to at least one of i) a PL RS set configured per type of the uplink signal or ii) a PL RS set configured in relation to the plurality of TCI states.

The method may further comprise transmitting UE capability information including information related to a maximum number of PL RSs that can be tracked by the UE for the measurement of the path loss.

The information related to the maximum number of PL RSs may include information for at least one of i) a maximum number of PL RSs capable of being activated based on a PL RS set configured per type of the uplink signal, ii) a maximum number of PL RSs capable of being activated based on a PL RS set configured in relation to the plurality of TCI states, or iii) a sum of the maximum number of PL RSs based on the i) and the maximum number of PL RSs based on the ii).

The closed-loop index may be based on one or more closed-loop indexes configured in relation to the plurality of TCI states. The one or more closed-loop indexes may be different from a closed-loop index configured per type of the uplink signal.

A number of the one or more closed-loop indexes may be determined based on a report of UE capability information representing a number of closed-loop indexes related to the plurality of TCI states.

The method may further comprise receiving downlink control information (DCI) including a transmission power control (TPC) command.

The transmission power of the uplink signal may be determined based on the one or more power control parameters and the TPC command, and the TPC command may be applied based on the closed-loop index.

The transmission of the uplink signal may be performed based on a plurality of component carriers (CCs), and the plurality of TCI states may be configured for each CC of the plurality of CCs.

The one or more power control parameters may be applied for power control for a specific CC related to the specific TCI state among the plurality of CCs.

The one or more power control parameters may be applied for power control for the plurality of CCs.

In another aspect of the present disclosure, there is provided a user equipment transmitting an uplink signal in a wireless communication system, the user equipment comprising one or more transceivers, one or more processors, and one or more memories operably connectable to the one or more processors.

The one or more memories are configured to store instructions that allow the one or more processors to perform operations based on being executed by the one or more processors.

The operations comprise receiving configuration information related to a plurality of transmission configuration indication (TCI) states, and transmitting the uplink signal based on a specific TCI state among the plurality of TCI states.

The specific TCI state may include at least one of i) a reference RS used for an uplink transmission or ii) a reference RS commonly used for the uplink transmission and a downlink reception.

A transmission power of the uplink signal may be determined based on the specific TCI state, and the specific TCI state may be related to one or more power control parameters for determining the transmission power of the uplink signal.

In another aspect of the present disclosure, there is provided a method of a base station for receiving an uplink signal in a wireless communication system, the method comprising transmitting configuration information related to a plurality of transmission configuration indication (TCI) states, and receiving the uplink signal based on a specific TCI state among the plurality of TC states.

The specific TCI state may include at least one of i) a reference RS used for an uplink reception or ii) a reference RS commonly used for the uplink reception and a downlink transmission.

A transmission power of the uplink signal may be determined based on the specific TCI state, and the specific TCI state may be related to one or more power control parameters for determining the transmission power of the uplink signal.

In another aspect of the present disclosure, there is provided a base station receiving an uplink signal in a wireless communication system, the base station comprising one or more transceivers, one or more processors, and one or more memories operably connectable to the one or more processors.

The one or more memories are configured to store instructions that allow the one or more processors to perform operations based on being executed by the one or more processors.

The operations comprise transmitting configuration information related to a plurality of transmission configuration indication (TCI) states, and receiving the uplink signal based on a specific TCI state among the plurality of TC states.

The specific TCI state may include at least one of i) a reference RS used for an uplink reception or ii) a reference RS commonly used for the uplink reception and a downlink transmission.

A transmission power of the uplink signal may be determined based on the specific TCI state, and the specific TCI state may be related to one or more power control parameters for determining the transmission power of the uplink signal.

In another aspect of the present disclosure, there is provided a device comprising one or more memories, and one or more processors functionally connected to the one or more memories.

The one or more memories are configured to store instructions that allow the one or more processors to perform operations based on being executed by the one or more processors.

The operations comprise receiving configuration information related to a plurality of transmission configuration indication (TCI) states, and transmitting the uplink signal based on a specific TCI state among the plurality of TCI states.

The specific TCI state may include at least one of i) a reference RS used for an uplink transmission or ii) a reference RS commonly used for the uplink transmission and a downlink reception.

A transmission power of the uplink signal may be determined based on the specific TCI state, and the specific TCI state may be related to one or more power control parameters for determining the transmission power of the uplink signal.

In another aspect of the present disclosure, there are provided one or more non-transitory computer readable mediums storing one or more instructions. The one or more instructions are configured to allow one or more processors to perform operations based on being executed by the one or more processors.

The operations comprise receiving configuration information related to a plurality of transmission configuration indication (TCI) states, and transmitting the uplink signal based on a specific TCI state among the plurality of TCI states.

The specific TCI state may include at least one of i) a reference RS used for an uplink transmission or ii) a reference RS commonly used for the uplink transmission and a downlink reception.

A transmission power of the uplink signal may be determined based on the specific TCI state, and the specific TCI state may be related to one or more power control parameters for determining the transmission power of the uplink signal.

According to aspects of the present disclosure, a power control operation can be beam-specifically performed. Accordingly, efficiency of the existing power control operation that has been specifically performed only on channel/reference signal can be improved.

According to aspects of the present disclosure, the present disclosure can resolve ambiguity on a UE operation generated as a PL RS configured per the existing defined channel/RS and a beam-specifically indicated PL RS coexist.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

6

Figure 17:
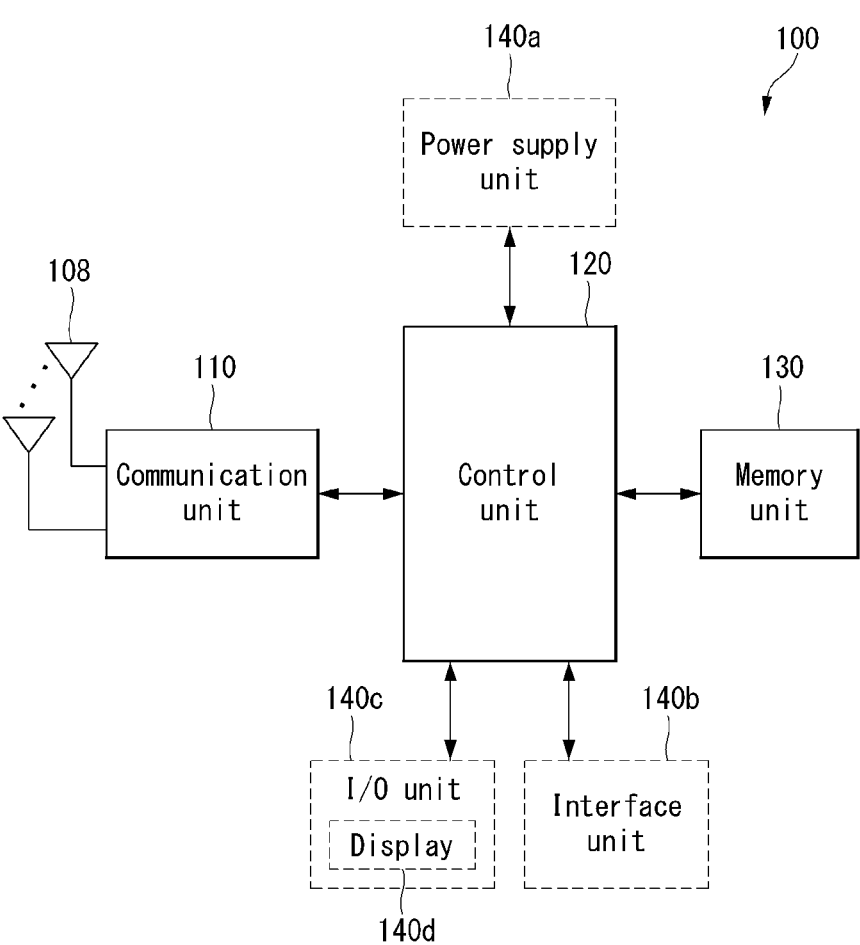

FIG. 17 illustrates a hand-held device applied to the present disclosure.

DETAILED DESCRIPTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE 36.211: Physical channels and modulation 36.212: Multiplexing and channel coding 36.213: Physical layer procedures 36.300: Overall description 36.331: Radio Resource Control (RRC)

3GPP NR 38.211: Physical channels and modulation 38.212: Multiplexing and channel coding 38.213: Physical layer procedures for control 38.214: Physical layer procedures for data 38.300: NR and NG-RAN Overall Description 38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

Figure 1:
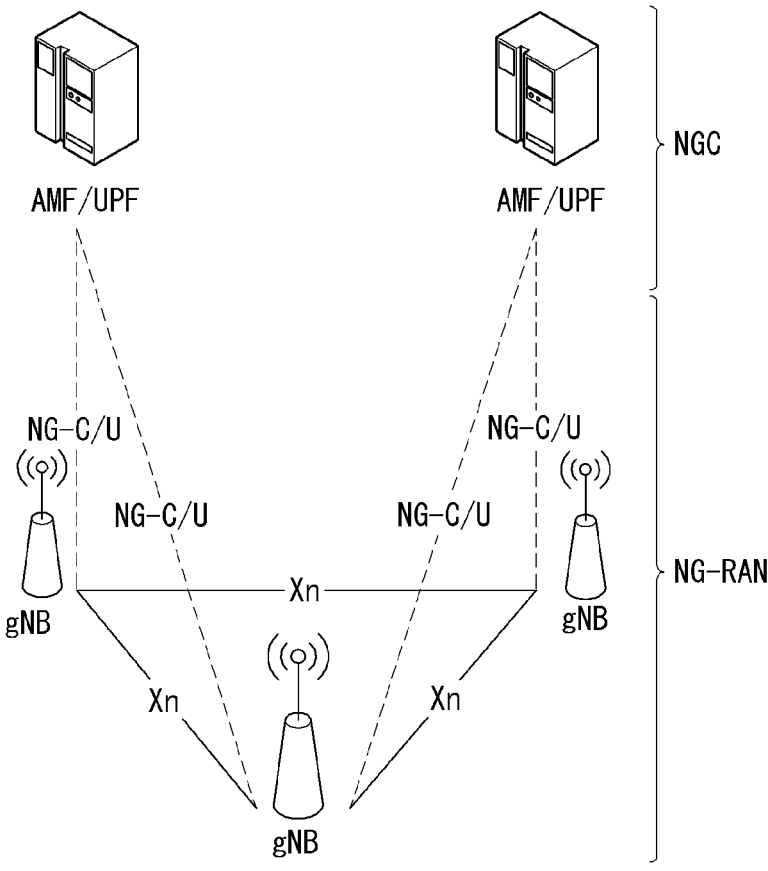
FIG. 1 is a diagram illustrating an example of an overall system structure of NR to which a method proposed in the present disclosure is applicable.

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, $\mu$). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| $\mu$ | $\Delta f = 2^{\mu} \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s = 1/(\Delta f_{max} \cdot N_f)$, where $\Delta f_{max} = 480 \cdot 10^3$, and $N_f = 4096$ Downlink and uplink transmissions is constituted of a radio frame with a period of $T_f = (\Delta f_{max} N_f / 100) \cdot T_s = 10$ ms. Here, the radio frame is constituted of 10 subframes each of which has a period of $T_{sf} = (\Delta f_{max} N_f / 1000) \cdot T_s = 1$ ms. In this case, one set of frames for uplink and one set of frames for downlink may exist.

Figure 2:
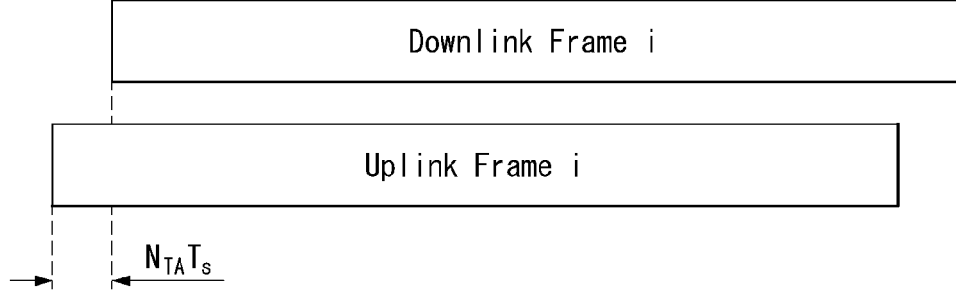
FIG. 2 illustrates a relationship between an uplink frame and a downlink frame in a wireless communication system to which a method proposed by the present disclosure is applicable.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA} = N_{TA} T_s$ earlier than the start of the downlink frame by the UE.

For numerology $\mu$, slots are numbered in ascending order of $$n_s^\mu \in \{0, \dots, N_{subframe}^{slots,\mu} - 1\}$$

in the subframe and in ascending order of $$n_{s,f}^\mu \in \{0, \dots, N_{frame}^{slots,\mu} - 1\}$$

in the radio frame. One slot includes consecutive OFDM symbols of $$N_{symb}^\mu,$$

and $$N_{symb}^\mu$$

is determined according to the used numerology and slot configuration. In the subframe, the start of slot $$n_s^\mu$$

is temporally aligned with the start of $$n_s^\mu N_{symb}^\mu.$$

Not all UEs are able to transmit and receive at the same time, and this means that not all OFDM symbols in a downlink slot or an uplink slot are available to be used. Table 3 represents the number $$N_{symb}^{slot}$$

of OFDM symbols per slot, the number $$N_{slot}^{frame,\mu}$$

of slots per radio frame, and the number $$N_{slot}^{subframe,\mu}$$

of slots per subframe in a normal CP. Table 4 represents the number of OFDM symbols per slot, the number of slots per radio frame, and the number of slots per subframe in an extended CP.

TABLE 3

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

Figure 3:
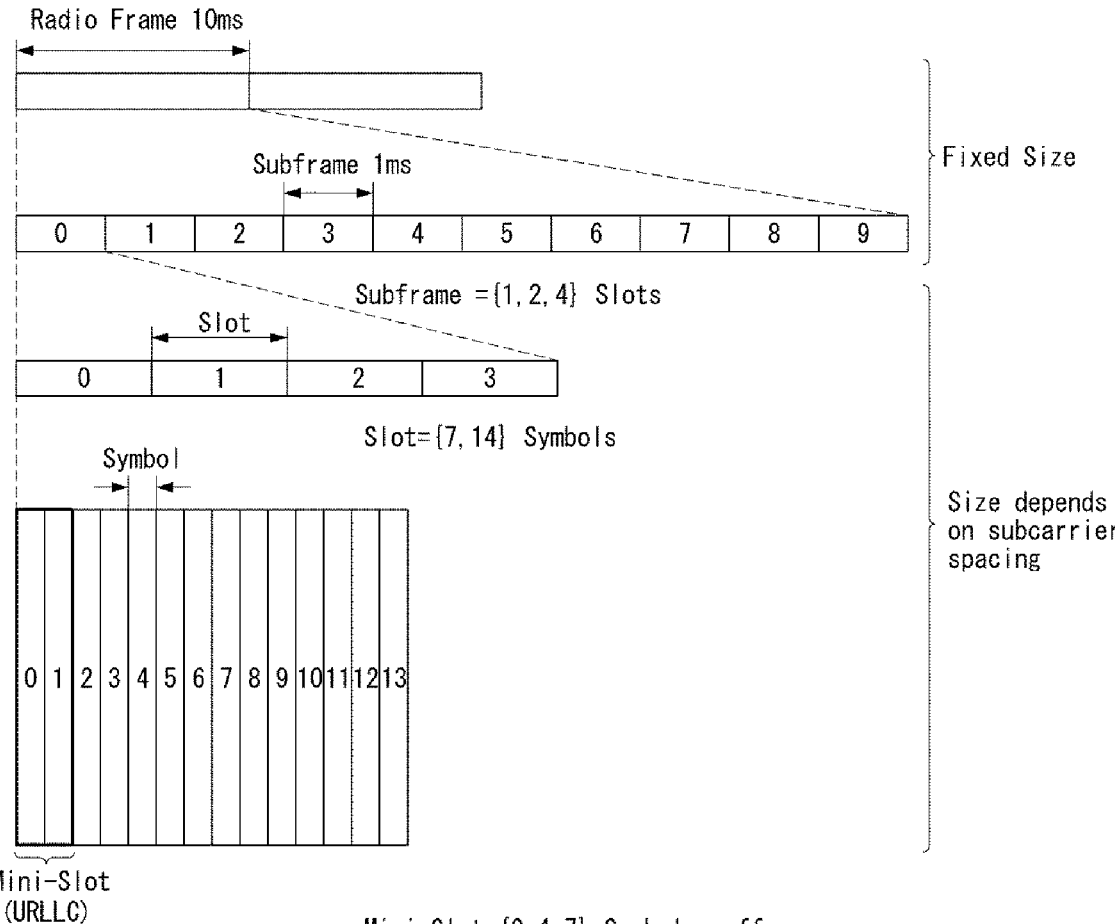
FIG. 3 illustrates an example of a frame structure in an NR system.

FIG. 3 illustrates an example of a frame structure in a NR system. FIG. 3 is merely for convenience of explanation and does not limit the scope of the present disclosure.

In Table 4, in case of $\mu=2$, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

Figure 4:
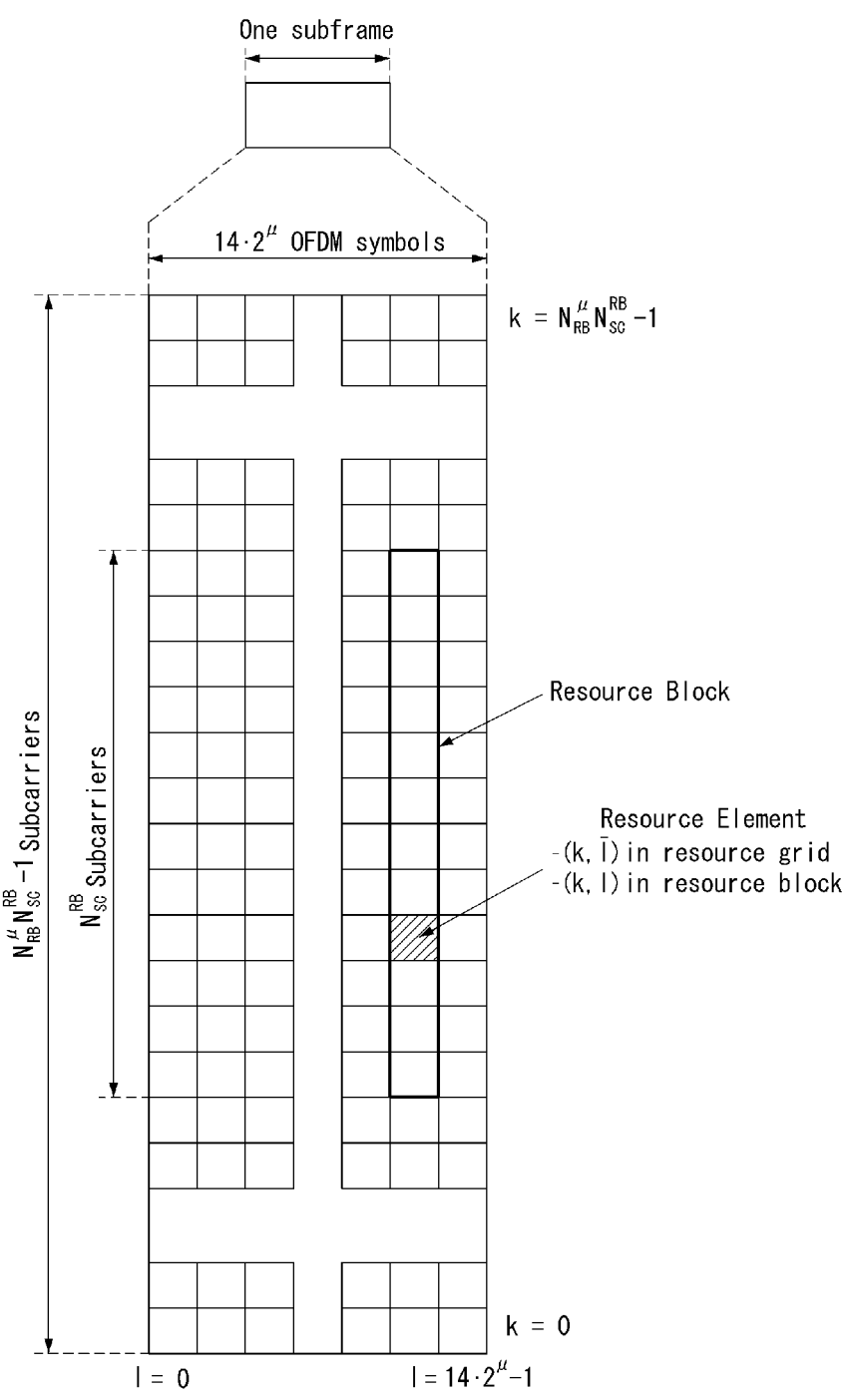
FIG. 4 illustrates an example of a resource grid supported by a wireless communication system to which a method proposed in the present disclosure is applicable.

FIG. 4 illustrates an example of a resource grid supported in a wireless communication system to which a method proposed in the present disclosure is applicable.

Referring to FIG. 4, a resource grid consists of $$N_{RB}^{\mu} N_{sc}^{RB}$$

subcarriers on a frequency domain, each subframe consisting of $14 \cdot 2^{\mu}$ OFDM symbols, but the present disclosure is not limited thereto.

In the NR system, a transmitted signal is described by one or more resource grids, consisting of $$N_{RB}^{\mu} N_{sc}^{RB}$$

subcarriers, and $$2^{\mu} N_{symb}^{(\mu)}$$

OFDM symbols, where $$N_{RB}^{(\mu)} \le N_{RB}^{max,\mu}. \quad N_{RB}^{max,\mu}$$

denotes a maximum transmission bandwidth and may change not only between numerologies but also between uplink and downlink.

Figure 5:
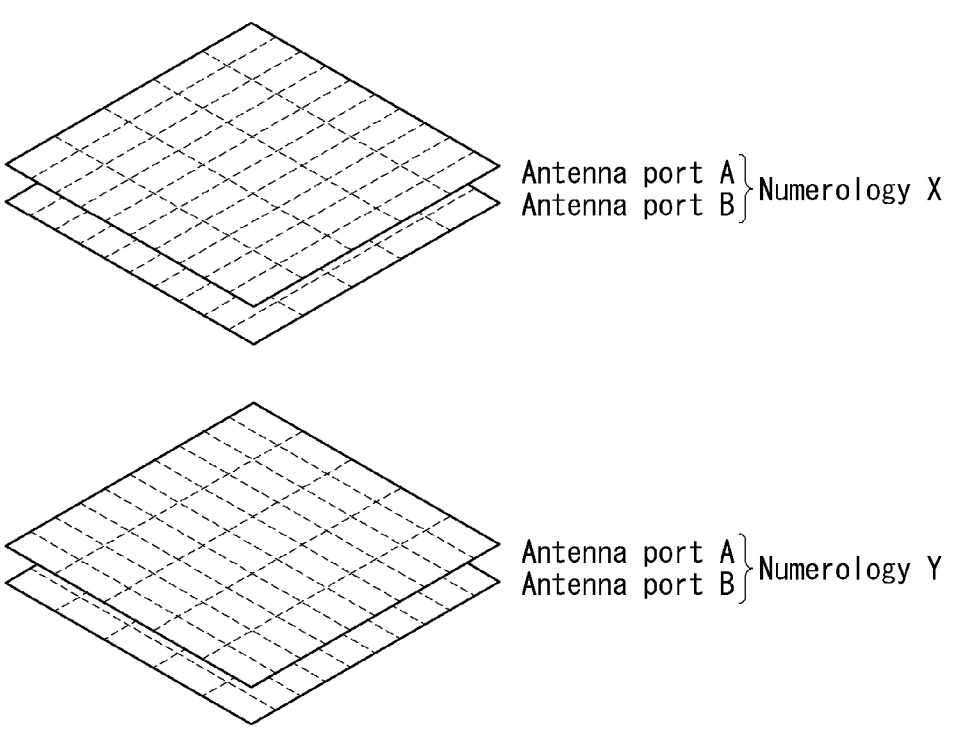
FIG. 5 illustrates examples of a resource grid for each antenna port and numerology to which a method proposed in the present disclosure is applicable.
Figure 6:
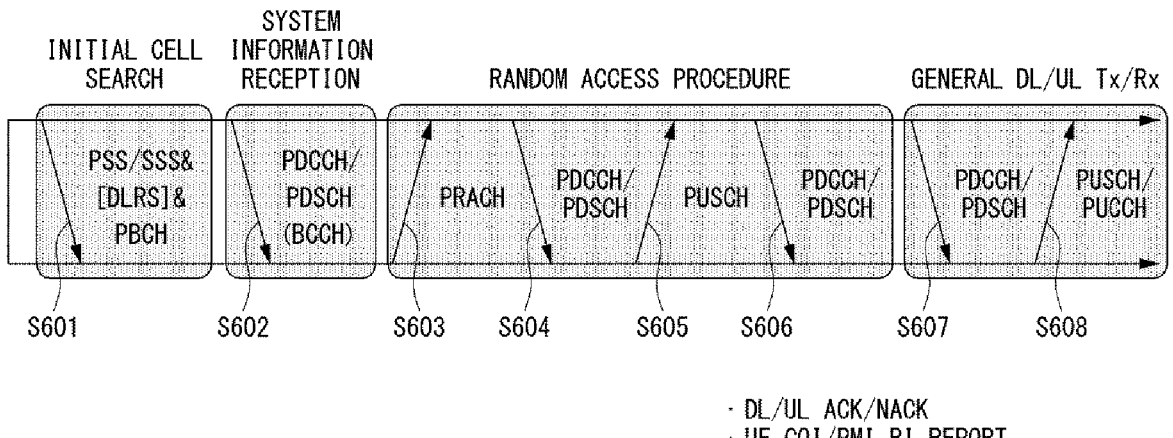
FIG. 6 illustrates physical channels and general signal transmission used in a 3GPP system.

In this case, as illustrated in FIG. 5, one resource grid may be configured per numerology $\mu$ and antenna port p.

FIG. 5 illustrates examples of a resource grid per antenna port and numerology to which a method proposed in the present disclosure is applicable.

Each element of the resource grid for the numerology $\mu$ and the antenna port p is called a resource element and is uniquely identified by an index pair $(k,\bar{l})$, where $$k = 0, \dots, N_{RB}^{\mu} N_{sc}^{RB} - 1$$

is an index on a frequency domain, and $$\bar{l} = 0, \dots, 2^{\mu} N_{symb}^{(\mu)} - 1$$

refers to a location of a symbol in a subframe. The index pair $(k,\bar{l})$ is used to refer to a resource element in a slot, where $$l = 0, \dots, N_{symb}^{(\mu)} - 1.$$

The resource element $(k,\bar{l})$ for the numerology $\mu$ and the antenna port p corresponds to a complex value $$a_{k,\bar{l}}^{(p,\mu)}.$$

When there is no risk for confusion or when a specific antenna port or numerology is not specified, the indexes p and $\mu$ may be dropped, and as a result, the complex value may be $$a_{k,\bar{l}}^{(p)}$$

or $\alpha_{k,\bar{l}}$.

Further, a physical resource block is defined as $$N_{sc}^{RB} = 12$$

consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration $\mu$.

The center of subcarrier 0 of common resource block 0 for the subcarrier spacing configuration $\mu$ coincides with 'point A'. A common resource block number $$n_{CRB}^{\mu}$$

in the frequency domain and resource elements (k, l) for the subcarrier spacing configuration $\mu$ may be given by the following Equation 1.

$$n_{CRB}^{\mu} = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $$N_{BWP,i}^{size} - 1,$$

13 where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $$N_{BWP,i}^{start}$$

may be the common resource block where the BWP starts relative to the common resource block 0.

Physical Channel and General Signal Transmission

FIG. 5 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S501). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S502).

Meanwhile, when there is no radio resource first accessing the eNB or for signal transmission, the UE may perform a Random Access Procedure (RACH) to the eNB (S503 to S506). To this end, the UE may transmit a specific sequence to a preamble through a Physical Random Access Channel (PRACH) (S503 and S505) and receive a response message (Random Access Response (RAR) message) for the preamble through the PDCCH and a corresponding PDSCH. In the case of a contention based RACH, a Contention Resolution Procedure may be additionally performed (S506).

The UE that performs the above procedure may then perform PDCCH/PDSCH reception (S507) and Physical Uplink Shared Channel (PUSCH)/Physical Uplink Control Channel (PUCCH) transmission (S508) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

Figure 7:
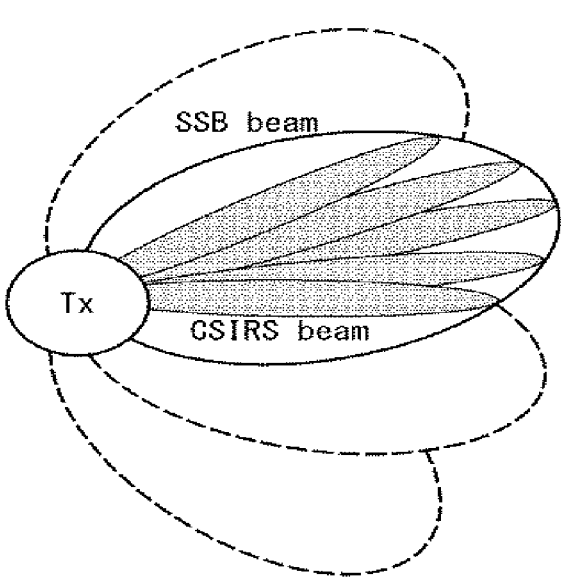
FIG. 7 illustrates an example of beamforming using SSB and CSI-RS.

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

US 12,634,831 B2

15

TABLE 5

```
-- ASN1START
-- TAG-TCI-STATE-START
TCI-State ::=                SEQUENCE {
    tci-StateId                 TCI-StateId,
    qcl-Type1                   QCL-Info,
    qcl-Type2                   QCL-Info
            OPTIONAL, -- Need R
    ...
}
QCL-Info ::=                 SEQUENCE {
    cell                        ServCellIndex
            OPTIONAL, -- Need R
    bwp-Id                      BWP-Id
            OPTIONAL, -- Cond CSI-RS-Indicated
    referenceSignal             CHOICE {
        csi-rs                      NZP-CSI-RS-ResourceId,
        ssb                         SSB-Index
    },
    qcl-Type                    ENUMERATED {typeA, typeB,
typeC, typeD},
    ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K>1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

Figure 8:
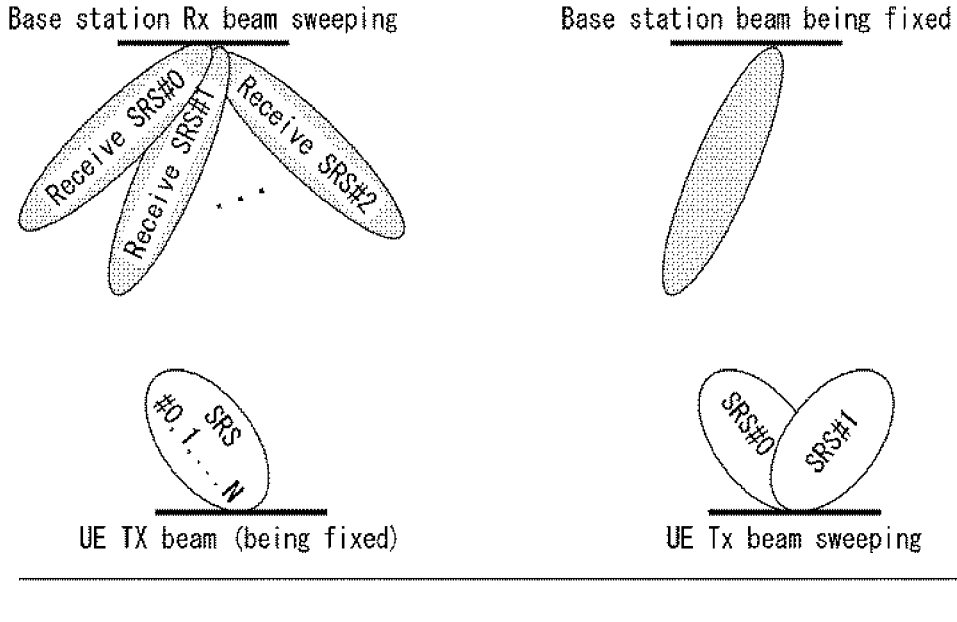
FIG. 8 illustrates an example of a UL BM procedure using an SRS.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

Figure 9:
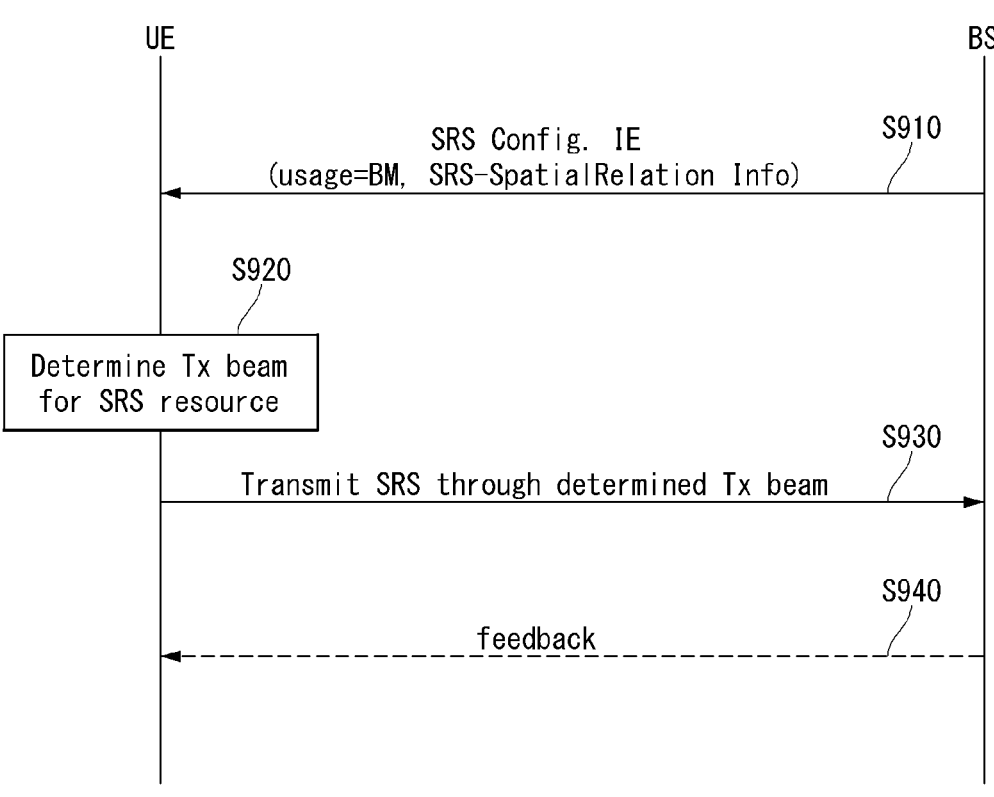
FIG. 9 is a flowchart showing an example of a UL BM procedure using the SRS.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam

TABLE 6

```
-- ASN1START
-- TAG-MAC-CELL-GROUP-CONFIG-START
SRS-Config ::=                           SEQUENCE {
    srs-ResourceSetToReleaseList              SEQUENCE (SIZE(1..maxNrofSRS-
ResourceSets)) OF SRS-ResourceSetId          OPTIONAL,   -- Need N
    srs-ResourceSetToAddModList               SEQUENCE (SIZE(1..maxNrofSRS-
ResourceSets)) OF SRS-ResourceSet             OPTIONAL,   -- Need N
    srs-ResourceToReleaseList                 SEQUENCE (SIZE(1..maxNrofSRS-
Resources)) OF SRS-ResourceId                 OPTIONAL, -- Need N
    srs-ResourceToAddModList                  SEQUENCE (SIZE(1..maxNrofSRS-
Resources)) OF SRS-Resource                   OPTIONAL,   -- Need N
    tpc-Accumulation                          ENUMERATED {disabled}
    ...
}
SRS-ResourceSet ::=                      SEQUENCE {
    srs-ResourceSetId                         SRS-ResourceSetId,
    srs-ResourceIdList                        SEQUENCE (SIZE(1..maxNrofSRS-
ResourcesPerSet)) OF SRS-ResourceId          OPTIONAL, -- Cond Setup
    resourceType                              CHOICE {
        aperiodic                                 SEQUENCE {
            aperiodicSRS-ResourceTrigger                  INTEGER (1..maxNrofSRS-
TriggerStates-1),
            csi-RS                                        NZP-CSI-RS-ResourceId
            slotOffset                                    INTEGER (1..32)
            ...
        },
        semi-persistent                           SEQUENCE {
            associatedCSI-RS                              NZP-CSI-RS-ResourceId
            ...
        },
        periodic                                  SEQUENCE {
            associatedCSI-RS                              NZP-CSI-RS-ResourceId
            ...
        }
    },
    usage                                     ENUMERATED {beamManagement,
codebook, nonCodebook, antennaSwitching},
    alpha                                     Alpha
    p0                                        INTEGER (-202..24)
    pathlossReferenceRS                       CHOICE {
        ssb-Index                                 SSB-Index,
        csi-RS-Index                              NZP-CSI-RS-ResourceId
SRS-SpatialRelationInfo ::=              SEQUENCE {
    servingCellId                             ServCellIndex
    referenceSignal                           CHOICE {
        ssb-Index                                 SSB-Index,
        csi-RS-Index                              NZP-CSI-RS-ResourceId,
        srs                                       SEQUENCE {
            resourceId                                SRS-ResourceId,
            uplinkBWP                                 BWP-Id
        }
    }
}
SRS-ResourceId ::=                       INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfig-Type' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

PUCCH Beam Indication

When the base station indicates, to the UE, a beam for use in PUCCH transmission, spatial relation info may be indicated/configured like the SRS. Spatial relation info may be SSB, CSI-RS, or SRS like SRS and provides reference RS information from the viewpoint of a beam to be used for PUCCH transmission as a target. In the case of PUCCH, a beam may be (differently) configured/indicated in units of PUCCH resources, and two schemes are supported. The first scheme is a method for always applying the corresponding spatial relation RS if transmitting the corresponding PUCCH if one spatial relation info is configured with the RRC message (i.e., RRC only). The second scheme is a method for indicating a specific one to be applied to a target PUCCH resource among a plurality of spatial relation RS information configured as RRC with a MAC-CE message after configuring two or more spatial relation info with an RRC message (that is, RRC+MAC-CE).

PUSCH Beam Indication

When the base station indicates, to the UE, a beam to be used for PUSCH transmission, with DCI format 0_1, an SRS resource serving as a reference may be indicated. In NR PUSCH transmission, two schemes are supported: a code-book (CB) based transmission scheme and a non-codebook based transmission scheme. Similar to LTE UL MIMO, the CB based transmission scheme indicates precoder information to be applied to a plurality of UE antenna ports to DCI through TPMI and TRI. However, unlike LTE, beamformed SRS resource transmission may be supported, and up to two SRS resources may be configured for CB based transmission. Since each SRS resource may be configured with different spatial relation info, it may be transmitted while beamformed in different directions. The base station receiving this may designate one of the two beams to be used when applying the PUSCH as a 1-bit SRS resource ID (SRI) field of DCI. For example, if a 4 Tx UE is configured with two 4-port SRS resources and each SRS resource is configured with a different spatial relation RS, each SRS resource is beamformed according to each spatial relation RS and each is transmitted to 4 ports. The base station selects and indicates one of the two SRS resources as SRI while simultaneously indicating TPMI and TRI together, as MIMO precoding information to be applied to SRS ports, which have been used for SRS resource transmission, as UL DCI. In non-CB based transmission, the UE may be configured with up to 4 1-port SRS resources. The UE indicated with this beamforms each SRS resource according to the spatial relation info and transmits it to the base station. Upon receiving it, the base station indicates one or more SRI(s) to be applied for PUSCH transmission. Unlike the CB based scheme, in the non-CB scheme, each SRS resource is configured with only 1 port, so that TPMI is not indicated. Resultantly, the number of SRS resources indicated (i.e., the number of SRIs) becomes identical to the transmission rank, and thus, the TRI is not indicated. As a result, the same beamforming (precoding) as a specific PUSCH DMRS port (or layer) is applied to each indicated 1 port SRS resource. In non-CB UL transmission, a specific NZP CSI-RS resource may be associated with each SRS resource by RRC (associatedCSI-RS IE in 38.331) and, when so configured, the associated NZP CSI-RS is also triggered when the aperiodic SRS for non-CB is triggered with DCI. In this case, the UE receives the triggered NZP CSI-RS, calculates a beam coefficient (or precoder) to be applied to each SRS resource (using channel reciprocity), and then transmits the SRS resources (sequentially).

When the base station schedules the PUSCH in DCI format 0_0, the direct beam indication method through DCI is not supported because the SRI field in the CB based or non-CB based transmission does not exist in DCI format 0_0. In this case, the UE transmits the corresponding PUSCH using the same beam as the beam to be applied to transmission of the PUCCH resource having the lowest ID among the PUCCH resources configured in the active BWP of the corresponding cell (that is, the spatial relation info is the same).

Uplink Power Control

In a wireless communication system, depending on a situation, the transmission power of a User Equipment (UE) and/or a mobile device may be required to be increased or decreased. As such, the control of the transmission power of the UE and/or the mobile device may be referred to as uplink power control. In one example, the transmission power control scheme may be applied to satisfy the requirements (SNR (Signal-to-Noise Ratio), BER (Bit Error Ratio), BLER (Block Error Ratio), etc.) of a base station (BS) (e.g., gNB, eNB, etc.).

The power control described above may be performed in an open-loop power control scheme and a closed-loop power control scheme.

Particularly, the open-loop power control scheme means a scheme of controlling transmission power without the feedback from a transmission device (e.g., base station, etc.) to a reception device (e.g., UE, etc.) and/or the feedback from a reception device to a transmission device. In one example, a UE may receive a specific channel/signal (pilot channel/signal) from a BS and estimate a strength of reception power by using the channel/signal. Thereafter, the UE may control transmission power by using the strength of reception power.

On the other hand, the closed-loop power control scheme means a scheme of controlling transmission power based on the feedback from a transmission device to a reception device and/or the feedback from a reception device to a transmission device. In one example, a BS may receive a specific channel/signal from a UE and determine an optimal power level of the UE based on a power level, SNR, BER, BLER, and the like, measured by the received specific channel/signal. The BS may forward information (i.e., feedback) for the determined optimal power level to the UE through a control channel, and the UE may control transmission power by using the feedback provided by the BS.

Hereinafter, the power control scheme for the cases in which a UE and/or a mobile device performs uplink transmission to a BS in a wireless communication system will be described in detail.

Particularly, hereinafter, the power control schemes are described for transmission of 1) UL data channel (e.g., PUSCH (Physical Uplink Shared Channel)), 2) UL control channel (e.g., PUCCH (Physical Uplink Control Channel)), 3) Sounding Reference Signal (SRS), and 4) random access channel (e.g., PRACH (Physical Random Access Channel)). In this case, the transmission occasion (i.e., transmission time unit) (i) for PUSCH, PUCCH, SRS and/or PRACH may be defined by a slot index ($n_s$), the first symbol (S) in a slot, the number of consecutive symbols (L) of a system frame number (SFN).

1) Power Control of UL Data Channel

Hereinafter, for the convenience of description, the power control scheme is described based on the case in which a UE performs PUSCH transmission. The scheme may be extendedly applied to other uplink data channels supported in a wireless communication system.

In the case of PUSCH transmission in an activated UL bandwidth part (UL BWP) of a carrier (f) in a serving cell (c), a UE may calculate a linear power value of transmission power which is determined by Equation 3 below. Thereafter, the UE may control the transmission power by considering the number of antenna ports and/or the number of SRS ports.

Particularly, in the case that the UE performs PUSCH transmission in the activated UL BWP (b) of the carrier (f) in the serving cell (c) by using the parameter set configuration based on index j and the PUSCH power control adjustment state based on index l, the UE may determine the PUSCH transmission power $P_{PUSCH,b,f,c}(i,j,q_d,l)$ (dBm) in the PUSCH transmission occasion (i) based on Equation 3 below.

[Equation 3]

$$P_{PUSCH,b,f,c}(i, j, q_d, l) =$$

$$\min \left\{ \begin{array}{l} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array} \right\}$$

[dBm]

In Equation 3, index j represents an index for an open-loop power control parameter (e.g., Po, alpha ($\alpha$), etc.), and up to 32 parameter sets per cell may be set. Index $q_d$ represents an index of a DL RS resource for the pathloss (PL) measurement (e.g., $PL_{b,f,c}(q_d)$), and up to 4 measurement values per cell may be set. Index l represents an index for a closed-loop power control process, and up to 2 processes per cell may be set.

Particularly, Po (e.g., $P_{O\_PUSCH,b,f,c}(j)$) may be a parameter broadcasted as a part of system information and represent a target reception power at a receiving side. The Po value may be set in consideration of a throughput of UE, a capacity of cell, a noise and/or interference. Furthermore, alpha (e.g., $\alpha_{b,f,c}(j)$) may represent a ratio of performing compensation for pathloss. The alpha may be set to a value from 0 to 1, and according to the set value, full pathloss compensation or fractional pathloss compensation may be performed. In this case, the alpha value may be set in consideration of interference and/or data rates between the UEs. Furthermore, $P_{CMAX, f,c}(i)$ may represent a set UE transmission power. For example, the set UE transmission power may be interpreted as the 'configured maximum UE output power' defined in 3GPP TS 38.101-1 and/or TS38.101-2. Furthermore, $$M_{RB,b,f,c}^{PUSCH}(i)$$

may represent a bandwidth of PUSCH resource allocations expressed as the number of resource blocks (RBs) for a PUSCH transmission occasion based on subcarrier spacing ($\mu$). In addition, $f_{b,f,c}(i,l)$ related to PUSCH power control adjustment state may be set or indicated based on a TPC command field of DCI (e.g., DCI format 0_0, DCI format 0_1, DCI format 2_2, DCI format 2_3, etc.).

In this case, a specific RRC (Radio Resource Control) parameter (e.g., SRI-PUSCHPowerControl-Mapping, etc.) may denote a linkage between SRI (SRS Resource Indicator) field of DCI (downlink control information) and indexes j, $q_d$, and l. In other words, the indexes j, l, $q_d$ and the like described above may be associated with a beam, a panel, and/or a spatial domain transmission filter based on specific information. Through this, the PUSCH transmission power control of the beam, panel, and/or spatial domain transmission filter unit may be performed.

The parameters and/or information for PUSCH power control described above may be individually (i.e., independently) set for each BWP. In this case, the parameters and/or information may be set or indicated through higher layer signaling (e.g., RRC signaling, MAC-CE (Medium Access Control-Control Element), etc.) and/or DCI. For example, the parameters and/or information for PUSCH power control may be transmitted through RRC signaling PUSCH-ConfigCommon, PUSCH-PowerControl, and the like, and PUSCH-ConfigCommon and PUSCH-PowerControl may be configured as represented in Table 7 below.

TABLE 7

```
PUSCH-ConfigCommon ::=                    SEQUENCE {
    groupHoppingEnabledTransformPrecoding    ENUMERATED {enabled}
    pusch-TimeDomainAllocationList           PUSCH-
TimeDomainResourceAllocationList
    msg3-DeltaPreamble                       INTEGER (-1..6)
    p0-NominalWithGrant                      INTEGER (-202..24)
    ...
}
PUSCH-PowerControl ::=                    SEQUENCE {
    tpc-Accumulation                         ENUMERATED { disabled }
    msg3-Alpha                               Alpha
    p0-NominalWithoutGrant                   INTEGER (-202..24)
    p0-AlphaSets                             SEQUENCE (SIZE (1..maxNrofP0-PUSCH-
AlphaSets)) OF P0-PUSCH-AlphaSet
    pathlossReferenceRSToAddModList              SEQUENCE (SIZE (1..maxNrofPUSCH-
PathlossReferenceRSs)) OF PUSCH-PathlossReferenceRS
    pathlossReferenceRSToReleaseList             SEQUENCE (SIZE (1..maxNrofPUSCH-
PathlossReferenceRSs)) OF PUSCH-PathlossReferenceRS-Id
    twoPUSCH-PC-AdjustmentStates             ENUMERATED {twoStates}
    deltaMCS                                 ENUMERATED {enabled}
    sri-PUSCH-MappingToAddModList                SEQUENCE (SIZE (1..maxNrofSRI-
PUSCH-Mappings)) OF SRI-PUSCH-PowerControl
    sri-PUSCH-MappingToReleaseList               SEQUENCE (SIZE (1..maxNrofSRI-
PUSCH-Mappings)) OF SRI-PUSCH-PowerControlId
}
```

The UE may determine or calculate PUSCH transmission power through the above-described scheme and transmit PUSCH by using the determined or calculated PUSCH transmission power.

2) Power Control of UL Control Channel

Hereinafter, for the convenience of description, a power control scheme based on the case in which a UE performs PUCCH transmission is described. The scheme may be extendedly applied to other uplink control channels supported by a wireless communication system.

Specifically, in the case that the UE performs PUCCH transmission in an activated UL BWP (b) of a carrier (f) of a primary cell (or secondary cell) (c) using power control adjustment state based on index l, the UE may determine PUCCH transmission power $P_{PUCCH,b,f,c}(i,q_u,q_d,l)$ (dBm) at PUCCH transmission occasion (i) based on Equation 4 below.

$$P_{PUCCH,b,f,c}(i, q_u, q_d, l) =$$
$$\min\left\{\begin{array}{l} P_{CMAX,f,c}(i), \\ P_{O\_PUCCH,b,f,c}(q_u) + 10\log_{10}\left(2^{\mu} \cdot M_{RB,b,f,c}^{PUSCH}(i)\right) + \\ PL_{b,f,c}(q_d) + \Delta_{F\_PUCCH}(F) + \Delta_{TF,b,f,c}(i) + g_{b,f,c}(i, l) \end{array}\right\}$$

[Equation 4]

[dBm]

In Equation 4, $q_u$ represents an index for an open-loop power control parameter (e.g., Po, etc.), and up to 8 parameter sets per cell may be set. Index $q_d$ represents an index of a DL RS resource for the pathloss (PL) measurement (e.g., $PL_{b,f,c}(q_d)$), and up to 4 measurement values per cell may be set. Index l represents an index for a closed-loop power control process, and up to 2 processes per cell may be set.

Particularly, Po (e.g., $P_{O\_PUCCH,b,f,c}(q_u)$) may be a parameter broadcasted as a part of system information and represent a target reception power at a receiving side. The Po value may be set in consideration of a throughput of UE, a capacity of cell, a noise and/or interference. Furthermore, $P_{CMAX,f,c}$) may represent a set UE transmission power. For example, the set UE transmission power may be interpreted as the 'configured maximum UE output power' defined in 3GPP TS 38.101-1 and/or TS38.101-2. Furthermore, $$M_{RB,b,f,c}^{PUCCH}(i)$$

may represent a bandwidth of PUCCH resource allocations expressed as the number of resource blocks (RBs) for a PUCCH transmission occasion based on subcarrier spacing (μ). In addition, the delta function (e.g., $\Delta_{F\_PUCCH}(F)$ and $\Delta_{TF,b,f,c}(i)$) may be set in consideration of a PUCCH format (e.g., PUCCH formats 0, 1, 2, 3, 4, etc.). In addition, $g_{b,f,c}(i,l)$ related to PUCCH power control adjustment state may be set or indicated based on a TPC command field of DCI (e.g., DCI format 1_0, DCI format 1_1, DCI format 2_2, etc.) received or detected by the UE.

In this case, a specific RRC (Radio Resource Control) parameter (e.g., PUCCH-SpatialRelationInfo, etc.) and/or a specific MAC-CE command (e.g., PUCCH spatial relation Activation/Deactivation, etc.) may be used to activate or deactivate a linkage between the PUCCH resource and indexes $q_u$, $q_d$, and l. For example, the PUCCH spatial relation Activation/Deactivation command in MAC-CE may activate or deactivate a linkage between the PUCCH resource and indexes $q_u$, $q_d$, and l based on the RRC parameter PUCCH-SpatialRelationInfo. In other words, the indexes $q_u$, $q_d$, l, and the like described above may be associated with a beam, a panel, and/or a spatial domain transmission filter based on specific information. Through this, the PUCCH transmission power control of the beam, panel, and/or spatial domain transmission filter unit may be performed.

The parameters and/or information for PUCCH power control described above may be individually (i.e., independently) set for each BWP. In this case, the parameters and/or information may be set or indicated through higher layer signaling (e.g., RRC signaling, MAC-CE, etc.) and/or DCL. For example, the parameters and/or information for PUCCH power control may be transmitted through RRC signaling PUCCH-ConfigCommon, PUCCH-PowerControl, and the like, and PUCCH-ConfigCommon and PUCCH-PowerControl may be configured as represented in Table 8 below.

TABLE 8

```
PUCCH-ConfigCommon ::=          SEQUENCE {
    pucch-ResourceCommon            INTEGER (0..15)
    pucch-GroupHopping              ENUMERATED { neither, enable,
disable },
    hoppingId                       INTEGER (0..1023)
    p0-nominal                      INTEGER (−202..24)
    ...
}
PUCCH-PowerControl ::=          SEQUENCE {
    deltaF-PUCCH-f0                 INTEGER (−16..15)
    deltaF-PUCCH-f1                 INTEGER (−16..15)
    deltaF-PUCCH-f2                 INTEGER (−16..15)
    deltaF-PUCCH-f3                 INTEGER (−16..15)
    deltaF-PUCCH-f4                 INTEGER (−16..15)
    p0-Set                          SEQUENCE (SIZE (1..maxNrofPUCCH-
P0-PerSet)) OF P0-PUCCH
    pathlossReferenceRSs            SEQUENCE (SIZE (1..maxNrofPUCCH-
PathlossReferenceRSs)) OF PUCCH-PathlossReferenceRS
    twoPUCCH-PC-AdjustmentStates    ENUMERATED {twoStates}
    ...
}
P0-PUCCH ::=                    SEQUENCE {
    p0-PUCCH-Id                     P0-PUCCH-Id,
    p0-PUCCH-Value                  INTEGER (−16..15)
}
P0-PUCCH-Id ::=                 INTEGER (1..8)
PUCCH-PathlossReferenceRS ::=       SEQUENCE {
    pucch-PathlossReferenceRS-Id        PUCCH-PathlossReferenceRS-Id,
    referenceSignal                     CHOICE {
        ssb-Index                           SSB-Index,
        csi-RS-Index                        NZP-CSI-RS-ResourceId
    }
}
```

The UE may determine or calculate PUCCH transmission power through the above-described scheme and transmit PUCCH by using the determined or calculated PUCCH transmission power.

3) Power Control of Sounding Reference Signal

In relation to transmission of sounding reference signal (SRS) at an activated UL BWP of a carrier (f) of a serving cell (c), the UE may calculate a linear power value of the transmission power determined by Equation 5 below. The UE may equally divide the calculated linear power value with respect to the antenna port(s) set for SRS to control the transmission power.

Particularly, in the case that the UE performs SRS transmission in the activated UL BWP (b) of a carrier (f) of a serving cell (c) using SRS power control adjustment state based on index l, the UE may determine SRS transmission power $P_{SRS,b,f,c}(i,q_s,l)$ (dBm) at SRS transmission occasion (i) based on Equation 5 below.

$$P_{SRS,b,f,c}(i, q_s, l) =$$

$$\min \left\{ \begin{array}{l} P_{CMAX,f,c}(i), \\ P_{O\_SRS,b,f,c}(q_s) + 10\log_{10}\left(2^{\mu} \cdot M_{SRS,b,f,c}(i)\right) + \\ \alpha_{SRS,b,f,c}(q_s) \cdot PL_{b,f,c}(q_d) + h_{b,f,c}(i, l) \end{array} \right\}$$

[Equation 5]

[dBm]

In Equation 5, $q_s$ may represent an index for an open-loop power control parameter (e.g., Po, alpha ($\alpha$), DL RS resource for pathloss (PL) measurements (e.g., $PL_{b,f,c}(q_d)$ etc.), and may be set for each SRS resource set. Index l may represent an index for a closed-loop power control process, and the index may be set independently from PUSCH or may be set in association. In the case that the SRS power control is not associated with PUSCH, the maximum number of the closed-loop power control processes for SRS may be 1.

Particularly, Po (e.g $P_{O\_SRS,b,f,c}(q_s)$) may be a parameter broadcasted as a part of system information and represent a target reception power at a receiving side. The Po value may be set in consideration of a throughput of UE, a capacity of cell, a noise and/or interference. Furthermore, alpha (e.g., $\alpha_{SRSb,f,c}(q_s)$) may represent a ratio of performing compensation for pathloss. The alpha may be set to a value from 0 to 1, and according to the set value, full pathloss compensation or fractional pathloss compensation may be performed. In this case, the alpha value may be set in consideration of interference and/or data rates between the UEs. Furthermore, $P_{CMAX,f,c}(i)$ may represent a set UE transmission power. For example, the set UE transmission power may be interpreted as the 'configured maximum UE output power' defined in 3GPP TS 38.101-1 and/or TS38.101-2. Furthermore, $M_{SRSb,f,c}$ may represent a bandwidth of SRS resource allocations expressed as the number of resource blocks (RBs) for an SRS transmission occasion based on subcarrier spacing ($\mu$). In addition, $h_{b,f,c}(i,l)$ related to SRS power control adjustment state may be set or indicated based on a TPC command field of DCI (e.g., DCI format 2_3, etc.) received or detected by the UE and/or RRC parameter (e.g., srs-PowerControlAdjustmentStates, etc.).

The resource for SRS transmission may be applied as a reference for determining a beam, a panel, and/or a spatial region transmission filter, and the like by the BS and/or the UE. Considering the point, the SRS transmission power control may be performed in a unit of the beam, panel, and/or spatial domain transmission filter.

The parameters and/or information for SRS power control described above may be individually (i.e., independently) set for each BWP. In this case, the parameters and/or information may be set or indicated through higher layer signaling (e.g., RRC signaling, MAC-CE, etc.) and/or DCI. For example, the parameters and/or information for SRS power control may be transmitted through RRC signaling SRS-Config, SRS-TPC-CommandConfig, and the like, and SRS-Config and SRS-TPC-CommandConfig may be configured as represented in Table 9 below.

the UE may determine PRACH transmission power $P_{PRACH,b,f,c}(i)$ (dBm) at PRACH transmission occasion (i) based on Equation 6 below.

$$P_{PRACH,b,f,c}(i)=\min\{P_{CMAX,f,c}(i),P_{PRACH,target,f,c}+PL_{b,f,c}\} \qquad \text{[Equation 6]}$$

TABLE 9

| | |
|---|---|
| SRS-Config ::= | SEQUENCE { |
| srs-ResourceSetToReleaseList | SEQUENCE (SIZE(1..maxNrofSRS- |
| ResourceSets)) OF SRS-ResourceSetId | |
| srs-ResourceSetToAddModList | SEQUENCE (SIZE(1..maxNrofSRS- |
| ResourceSets)) OF SRS-ResourceSet | |
| srs-ResourceToReleaseList | SEQUENCE (SIZE(1..maxNrofSRS- |
| Resources)) OF SRS-ResourceId | |
| srs-ResourceToAddModList | SEQUENCE (SIZE(1..maxNrofSRS- |
| Resources)) OF SRS-Resource | |
| tpc-Accumulation | ENUMERATED {disabled} |
| ... | |
| } | |
| SRS-ResourceSet ::= | SEQUENCE { |
| srs-ResourceSetId | SR-ResourceSetId, |
| srs-ResourceIdList | SEQUENCE (SIZE(1..maxNrofSRS- |
| ResourcesPerSet)) OF SRS-ResourceId | |
| resourceType | CHOICE { |
| aperiodic | SEQUENCE { |
| aperiodicSRS-ResourceTrigger | INTEGER (1..maxNrofSRS- |
| TriggerStates−1), | |
| csi-RS | NZP-CSI-RS-ResourceId |
| slotOffset | INTEGER (1..32) |
| ..., | |
| [[ | |
| aperiodicSRS-ResourceTriggerList-v1530 | SEQUENCE |
| (SIZE(1..maxNrofSRS-TriggerStates−2)) | |
| | OF INTEGER |
| (1..maxNrofSRS-TriggerStates−1) | |
| ]] | |
| }, | |
| semi-persistent | SEQUENCE { |
| associatedCSI-RS | NZP-CSI-RS-ResourceId |
| ... | |
| }, | |
| periodic | SEQUENCE { |
| associatedCSI-RS | NZP-CSI-RS-ResourceId |
| ... | |
| } | |
| }, | |
| usage | ENUMERATED {beamManagement, codebook, |
| nonCodebook, antennaSwitching}, | |
| alpha | Alpha |
| p0 | INTEGER (−202..24) |
| pathlossReferenceRS | CHOICE { |
| ssb-Index | SSB-Index, |
| csi-RS-Index | NZP-CSI-RS-ResourceId |
| } | |
| srs-PowerControlAdjustmentStates | ENUMERATED { sameAsFci2, |
| separateClosedLoop} | |
| ... | |
| } | |
| SRS-TPC-CommandConfig ::= | SEQUENCE { |
| startingBitOfFormat2-3 | INTEGER (1..31) |
| fieldTypeFormat2-3 | INTEGER (0.. 1) |
| ..., | |
| [[ | |
| startingBitOfFormat2-3SUL-v1530 | INTEGER (1..31) |
| ]] | |
| } | |

The UE may determine or calculate SRS transmission power through the above-described scheme and transmit SRS by using the determined or calculated SRS transmission power.

4) Power Control of Random Access Channel

In the case that the UE performs PRACH transmission in the activated UL BWP (b) of a carrier (f) of a serving cell (c),

[dBm]

In Equation 6, $P_{CMAX, f,c}(i)$ may represent a set UE transmission power. For example, the set terminal transmission power may be interpreted as the 'configured maximum UE output power' defined in 3GPP TS 38.101-1 and/or TS38.101-2. Furthermore, $P_{PRACH,target,f,c}$ represents PRACH target reception power provided through higher layer signaling (e.g., RRC signaling, MAC-CE, etc.) for the activated UL BWP. Furthermore, $PL_{b,f,c}$ represents a path-loss for the activated UL BWP and may be determined based on DL RS associated with PRACH transmission at the activated DL BWP. For example, the UE may determine a pathloss associated with PRACH transmission based on SS (Synchronization Signal)/PBCH (Physical Broadcast Channel) blocks associated with PRACH transmission.

The parameters and/or information for PRACH power control described above may be individually (i.e., independently) set for each BWP. In this case, the parameters and/or information may be set or indicated through higher layer signaling (e.g., RRC signaling, MAC-CE, etc.) and/or DCI. For example, the parameters and/or information for PRACH power control may be transmitted through RRC signaling RACH-ConfigGeneric and the like, and RACH-ConfigGeneric may be configured as represented in Table 10 below.

TABLE 10

| RACH-ConfigGeneric ::= | SEQUENCE { |
| prach-ConfigurationIndex | INTEGER (0..255), |
| msg1-FDM | ENUMERATED {one, two, four, eight}, |
| msg1-Frequency Start | INTEGER |
| (0..maxNrofPhysicalResourceBlocks−1), | |
| zeroCorrelationZoneConfig | INTEGER(0..15), |
| preambleReceivedTargetPower | INTEGER (−202..−60), |
| preambleTransMax | ENUMERATED {n3, n4, n5, n6, n7, n8, |
| n10, n20, n50, n100, n200}, | |
| powerRampingStep | ENUMERATED {dB0, dB2, dB4, dB6}, |
| ra-ResponseWindow | ENUMERATED {sl1, sl2, sl4, sl8, sl10, |
| sl20, sl40, sl80}, | |
| ... | |
| } | |

The UE may determine or calculate PRACH transmission power through the above-described scheme and transmit PRACH by using the determined or calculated PRACH transmission power.

5) Transmission Power Control Procedure

Figure 10:
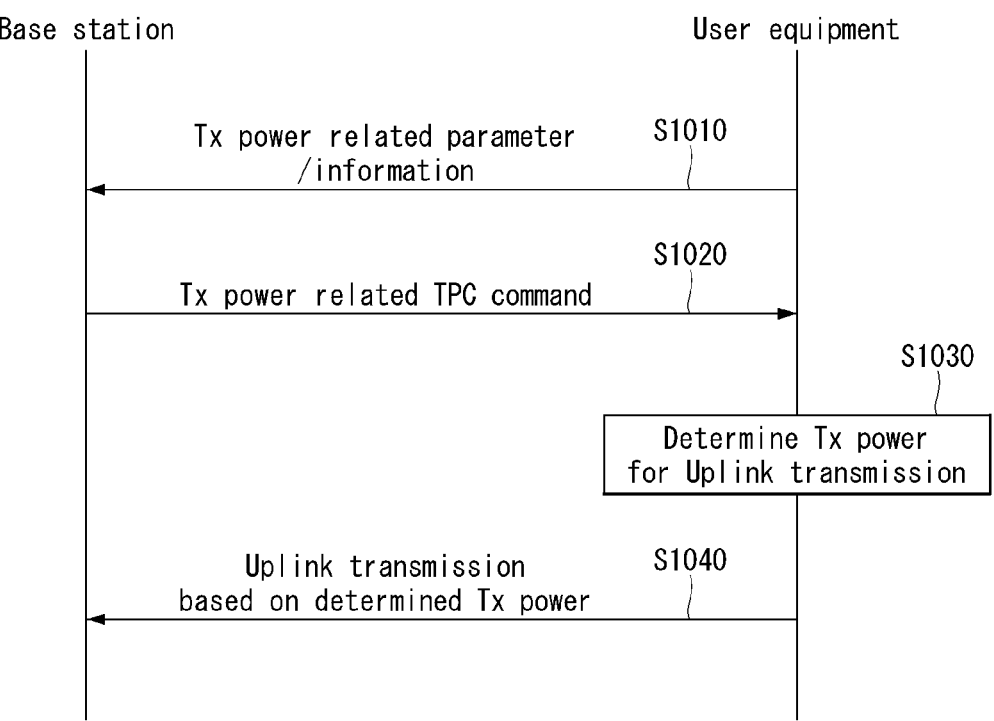
FIG. 10 illustrates an example of a procedure for controlling UL transmission power to which the method proposed in the present disclosure is applicable.

FIG. 10 illustrates an example of a procedure for controlling UL transmission power to which the method proposed in the present disclosure is applicable.

First, a User Equipment (UE) may receive parameter and/or information related to transmission power (Tx power) from a base station (BS) (step S1010). In this case, the UE may receive the parameter and/or information through higher layer signaling (e.g., RRC signaling, MAC-CE, etc.). In one example, in relation to PUSCH transmission, PUCCH transmission, SRS transmission, and/or PRACH transmission, the UE may receive the parameter and/or information (e.g., Table 7, Table 8, Table 9, Table 10, etc.) related to the transmission power control described in 1) to 4) above.

Thereafter, the UE may receive TPC command in relation to the transmission power from the BS (step S1020). In this case, the UE may receive the TPC command through lower layer signaling (e.g., DCI). In one example, in relation to PUSCH transmission, PUCCH transmission, and/or SRS transmission, the UE may receive information for the TPC command to be used to determine power control adjustment state through a TPC command field of a predefined DCI format as described in 1) to 3) above. However, for PRACH transmission case, the corresponding step may be omitted.

Thereafter, the UE may determine (or calculate) transmission power for a UL transmission based on parameter, information, and/or TPC command received from the BS (step S1030). In one example, the UE may determine PUSCH transmission power, PUCCH transmission power, SRS transmission power, and/or PRACH transmission power based on the scheme (e.g., Equation 3, Equation 4, Equation 5, Equation 6, etc.) described in 1) to 4) above. And/or, in the case that two or more UL channels and/or signals are required to be transmitted in overlapped manner, like a situation as carrier aggregation, the UE may determine transmission power for a UL transmission considering priority order in 5) described above.

Thereafter, the UE may perform transmission of one or more UL channels and/or signals (e.g., PUSCH, PUCCH, SRS, PRACH, etc.) for the BS (step S1040).

The foregoing description (e.g., 3GPP system, frame structure, NR system) may be applied in combination with the methods proposed in the disclosure or may be added up to clarify the technical characteristics of the methods proposed in the disclosure. Further, the embodiments and/or methods described in the disclosure are differentiated solely for ease of description, and some components in any one method may be replaced, or combined with components of another method.

The following describes a method of configuring/indicating UL power control for a UE upon common beam update using a joint and/or separate DL/UL TCI state of a base station, and describes a power control behavior of a subsequent UE.

In NR Rel-15/Rel-16, power control configuration/indication for the UE of the base station is performed by configuration for each UL channel/RS (i.e., PUSCH, PUCCH, SRS) (see the above-described uplink power control).

Table 11 below is an agreement related to common beam update/indication.

TABLE 11

@RAN1 #102e
Agreement
Note: the enumeration for issues (such as "issue 1a), 1b), 6) in the proposal below refers to
the enumeration within the proposals, not Table 1 in the FL summary.
- [Issue 1] For Rel.17 NR FeMIMO, on the unified TCI framework
    a)  Support joint TCI for DL and UL based on and analogous to Rel.15/16 DL
        TCI framework
        ■  The term "TCI" at least comprises a TCI state that includes at least
           one source RS to provide a reference (UE assumption) for
           determining QCL and/or spatial filter
        ■  The source reference signal(s) in M TCIs provide common QCL
           information at least for UE-dedicated reception on PDSCH and all or
           subset of CORESETs in a CC
             •  FFS: Optionally this common QCL information can also
                apply to CSI-RS resource for CSI, CSI-RS resource for BM,
                and CSI-RS for tracking
             •  FFS: Applicability on PDSCH includes PDSCH default
                beam
             •  Working Assumption: Select between M=1 and M>=1
        ■  The source reference signal(s) in N TCIs provide a reference for
           determining common UL TX spatial filter(s) at least for dynamic-
           grant/configured-grant based PUSCH, all or subset of dedicated
           PUCCH resources in a CC,
             •  Optionally, this UL TX spatial filter can also apply to all
                SRS resources in resource set(s) configured for antenna
                switching/codebook-based/non-codebook-based UL
                transmissions
             •  FFS: applicability of this UL TX spatial filter to SRS
                configured for beam management (BM)
             •  FFS: PUSCH port determination based on the TCI, e.g., to be
                mapped with SRS ports analogous to Rel.15/16
             •  Working Assumption: Select between N=1 and N>=1
        ■  FFS: extension to common QCL information applied to only some
           of the CORESETs or PUCCH resources in a CC, e.g., for mTRP
        ■  FFS: When used for the purpose of joint beam indication for UL and
           DL, whether a joint TCI pool for DL and UL dedicated for the
           purpose is used, or the same TCI pool as that used for the purpose of
           separate DL/UL beam indication is used
        ■  Note: The resulting beam indication directly refers to the associated
           source RS(s)
        ■  FFS (RAN1#103-e): Details on extension to intra- and inter-band
           CA
        ■  FFS (RAN1#103-e): The supported number of active TCI states
           considering factors such as multi-TRP and issue 6
        ■  FFS (RAN1#103-e): Applicable QCL types, and co-existence with
           DL TCI and spatial relation indication in Rel.15/16
    b)  In RAN1#103-e, investigate, for the purpose of down selection, the
        following alternatives for accommodating the case of separate beam
        indication for UL and DL
        ■  Alt1. Utilize the joint TCI to include references for both DL and UL
           beams
        ■  Alt2. Utilize two separate TCI states, one for DL and one for UL.
           The TCI state for the DL is the same as agreed in 1a. The TCI state
           for the UL can be newly introduced.
             •  Alt 2-1: The UL TCI state is taken from the same pool of
                TCI states as the DL TCI state
             •  Alt 2-2: The UL TCI state is taken from another pool of TCI
                states than the DL TCI state
        ■  Note: The resulting beam indication directly refers to the associated
           source RS(s)
        ■  FFS (RAN1#103-e): Details on extension to intra- and inter-band
           CA
        ■  Note: This may be related to issue 5 as well as other reasons for
           different TCIs such as network flexibility/scheduling
    c)  Support the use of SSB/CSI-RS for BM and/or SRS for BM as source RS to
        determine a UL TX spatial filter in the unified TCI framework
        ■  Whether the UL TX spatial filter corresponds to UL TCI (separate
           from DL TCI) depends on the outcome of 1b) above
        ■  FFS: Support the use of non-BM CSI-RS and/or non-BM SRS in
           addition
    d)  In RAN1#103-e, decide if SRS for BM can be configured as a source RS to
        represent a DL RX spatial filter in the unified TCI framework
    e)  In RAN1#103-e, decide/finalize all other parameters included in or
        concurrent with (but not included in) the TCI, e.g. UL-PC-related
        parameters (involving P0/alpha, PL RS, and/or closed loop index), UL-
        timing-related parameters TABLE 11-continued f)   In RAN1#103-e, identify issues pertaining to alignment between DL and UL default beam assumptions using the unified TCI framework

- [Issue 2] For Rel.17 NR FeMIMO, on L1/L2-centric inter-cell mobility:
  - a) In RAN1#103-e, finalize scope and use cases for L1/L2-centric inter-cell mobility, including:
    - ■ Applicability in various non-CA and CA setups such as intra-band and inter-band CA
    - ■ Use cases in comparison to Rel.15 L3-based handover (HO) taking into account potential extension of DAPS-based Rel.16 mobility enhancement to FR2-FR2 HO
    - ■ The extent of RAN2 impact (MAC CE, RRC, user plane protocols)
    - ■ Network architecture, e.g. NSA vs. SA, inter-RAT scenarios
  - b) In RAN1#103-e, depending on the outcome of 2a), further identify additional components -along with the associated alternatives -required for supporting inter-cell mobility based on the same unified TCI framework as that for intra-cell mobility (including dynamic TCI state update signaling), including
    - ■ Method(s) for incorporating non-serving cell information associated with TCI
    - ■ Method(s) for DL measurements and UE reporting (e.g. L1-RSRP) associated with non-serving cell(s)
    - ■ UE behavior for reception of signals and non-UE-specific control and data channels associated with non-serving cell(s)
    - ■ UL-related enhancements, e.g. related to RA procedure including TA
    - ■ Beam-level event-driven mechanism for L1/L2-centric inter-cell mobility
- [Issue 3] For Rel.17 NR FeMIMO, on dynamic TCI state update signaling medium:
  - a) In RAN1#103-e, investigate, for the purpose of down selection, the following alternatives:
    - ■ Alt1. DCI
    - ■ Alt2. MAC CE
    - ■ Note: Combination between DCI and MAC CE for, e.g. different use cases or control information partitioning can also be considered
    - ■ Note: The study should consider factors such as feasibility for pertinent use cases, performance (based on at least the agreed EVM), overhead (including PDCCH capacity), latency, flexibility, reliability including the support of retransmission
    - ■ Note: This may be related to outcome of issue 1a), 1b), and 6a)
  - b) In RAN1#103-e, depending on the outcome of 3a), identify candidates for more detailed design issues for the dynamic TCI state update such as
    - ■ Exact content
    - ■ Signaling format
    - ■ Reliability aspects including the support of retransmission
    - ■ Extensions, including the support of UE-group (in contrast to UE-dedicated) signaling
- [Issue 4] For Rel.17 NR FeMIMO, on MP-UE assumption to facilitate fast UL panel selection:
  - a) The following assumptions are used:
    - ■ In terms of RF functionality, a UE panel comprises a collection of TXRUs that is able to generate one analog beam (one beam may correspond to two antenna ports if dual-polarized array is used)
    - ■ UE panels can constitute the same as well as different number of antenna ports, number of beams, and EIRP
    - ■ No beam correspondence across different UE panels
    - ■ FFS: For each UE panel, it can comprise an independent unit of PC, FFT timing window, and/or TA.
    - ■ FFS: Same or different sets of UE panels can be used for DL reception and UL transmission, respectively
  - b) In RAN1#103-e, identify candidate use cases including MPE, and consider remaining aspects if use cases are identified
  - c) In RAN1#103-e, identify candidate signaling schemes for the following:
    - ■ NW to MP-UE (taking into account potential extension of the unified TCI framework in issue 1)
    - ■ MP-UE to NW
- [Issue 5] For Rel.17 NR FeMIMO, on MPE mitigation (that is, minimizing the UL coverage loss due to the UE having to meet the MPE regulation), in RAN1#103-e:
  - a) If needed, identify candidate solutions to be down-selected in future meeting(s). The following sub-categories can be used:
    - ■ CAT0. The need for specification support for MPE event detection and, if needed, candidate solutions
    - ■ CAT1. The need for UE reporting associated with an MPE and/or a potential/anticipated MPE event if the UE selects a certain UL spatial resource, e.g., corresponding to DL or UL RS
    - ■ CAT2. The need for NW signaling in response to the reported MPE event (taking into account issue 1) and UE behavior after receiving the NW signaling TABLE 11-continued

- ■ Note: RAN4 has agreed to specify P-MPR reporting (cf. CRs for TS 38.101/102/133) which can be used as a baseline scheme for further enhancement
- ■ Note: This may be related to outcome of issue 4b)
  - b) Companies are encouraged to submit evaluation results based on the agreed EVM to justify the benefits of the candidate solutions
- • [Issue 6] For Rel.17 NR FeMIMO,
  - a) add another category on performing study and, if needed, specifying feature(s) for beam acquisition (including beam tracking and refinement) latency reduction, especially for scenarios with high-speed UEs and large number of configured TCI states
  - b) Partial BFR will be handled in ITEM 2c (BM enhancement for mTRP)

Note: The target "RAN1#103-e" is understood as best-effort, i.e. to finalize as many components as possible based on the status of companies' contributions.

@RAN1 #103e

Agreement

On beam indication signaling medium to support joint or separate DL/UL beam indication in Rel.17 unified TCI framework:

- • Support L1-based beam indication using at least UE-specific (unicast) DCI to indicate joint or separate DL/UL beam indication from the active TCI states
  - ○ The existing DCI formats 1_1 and 1_2 are reused for beam indication
  - ○ Support a mechanism for UE to acknowledge successful decoding of beam indication
    - ■ The ACK/NAK of the PDSCH scheduled by the DCI carrying the beam indication can be used as an ACK also for the DCI
    - ■ FFS: Whether any additional specification support is needed
- • Support activation of one or more TCI states via MAC CE analogous to Rel.15/16:
  - ○ At least for the single activated TCI state, the activated TCI state is applied
  - ○ The content for the MAC CE is determined based on the outcome of issue 1
  - ○ FFS: If supported, default TCI state when more than one TCI states are activated by MAC CE
  - ○ Note: There is no implications on the support of single TRP or multi-TRP
- • FFS: Additional enhancement such as L1-based beam indication with group-common DCI
- • FFS: Whether the Rel.17 beam indication can also apply to beam indication for single channel (e.g. PDSCH only, single CORESET) or a subset of channels
- • FFS: Additional details on extending the support of L1-based beam indication when separate UL (from DL) common beam indication is configured Agreement On Rel-17 unified TCI framework, to accommodate the case of separate beam indication for UL and DL:

- • Utilize two separate TCI states, one for DL and one for UL.
  - ○ FFS: Contents of separate UL TCI state
  - ○ Note: For FR1, UE does not expect UL TCI to provide a reference for determining common UL TX spatial filter(s), if UL TCI is supported for FR1
- • For the separate DL TCI:
  - ○ The source reference signal(s) in M TCIs provide QCL information at least for UE-dedicated reception on PDSCH and for UE-dedicated reception on all or subset of CORESETs in a CC
- • For the separate UL TCI:
  - ○ The source reference signal(s) in N TCIs provide a reference for determining common UL TX spatial filter(s) at least for dynamic-grant/configured-grant based PUSCH, all or subset of dedicated PUCCH resources in a CC
  - ○ Optionally, this UL TX spatial filter can also apply to all SRS resources in resource set(s) configured for antenna switching/codebook-based/non-codebook-based UL transmissions
- • FFS: Whether the UL TCI state is taken from a common/same or separate TCI state pool from DL TCI state
  - ○ Note that TCI state pool for joint DL and UL beam indication is still FFS
- • FFS: Whether Rel.17 supports TCI configured for single channel (e.g. PDSCH only, single CORESET)
- • Note: This does not preclude the type of UE supporting only 1 beam tracking loop, i.e. UE reports value of 1 in UE FG 2-62.

Conclusion

There is no consensus in RAN1 to include the following as part of RAN1 agreement for AI 8.1.1 in RAN1 #103e:

- • FFS beam indication for the TCI state assumption/update for the following cases:
  - ○ The beam indication UE-specific DCI (i.e. the CORESETs with the DCI received by UE), the scheduled PDSCH by the DCI and the associated PUCCH for the acknowledgment of the beam indication DCI
  - ○ Non-UE-specific CORESETs and PUSCH/PDSCH scheduled/activated and PUCCH transmission triggered by non-UE-specific CORESETs Agreement On Rel-17 unified TCI framework, support common TCI state ID update and activation to provide common QCL information and/or common UL TX spatial filter(s) across a set of configured CCs:

- • The above applies to intra-band CA
- • The above applies to joint DL/UL and separate DL/UL beam indications TABLE 11-continued

- Just as Rel.16, the RS in the TCI state that provides QCL-TypeA [or QCL-TypeB]
  shall be in the same CC as the target channel or RS
- The common TCI state ID implies that the same/single RS determined according to
  the TCI state(s) indicated by a common TCI state ID is used to provide QCL Type-
  D indication and to determine UL TX spatial filter across the set of configured CCs
- FFS: The above also applies to inter-band CA
- FFS: TCI state pool for CA
    o Opt-1: sharing a single RRC TCI state pool for the set of configured CCs,
      e.g., cell-group TCI state pool, or reuse TCI state pool for PDSCH in a
      reference cell; A CC ID for QCL-Type A RS is absent in a TCI state, and
      the CC ID for QCL-Type A RS is determined according to a target CC of
      the TCI state.
        ■ FFS: Whether it is possible that a single TCI state in the pool
          includes all source RSs from different CCs
    o Opt-2: configuring RRC TCI state pool per individual CC
- FFS: Whether the Rel-17 common beam update across multiple CCs applies to
  beam indication for single channel (e.g. PDSCH only, single CORESET), a subset
  of channels, or all channels
Agreement
On Rel-17 unified TCI framework:
- A pool of joint DL/UL TCI state is used for joint DL/UL TCI state update (beam
  indication).
- FFS: The pool for separate DL and UL TCI state update (beam indication)
- Note: Here, TCI state pool refers to a pool configured via higher-layer (RRC)
  signaling
- FFS: Whether joint TCI may include UL specific parameter(s) such as UL
  PC/timing parameters, PL RS, panel-related indication,etc. and if it is included, it is
  used only for UL transmission of the DL and UL transmissions to which the joint
  TCI is applied
Agreement
In RAN1#104-e, on the Rel-17 L1-based TCI state update (beam indication) for the unified
TCI framework, interested companies are to provide the following:
- How to use DCI formats 1__1 and 1__2 for UL-only (in case of separate DL/UL)
  TCI state update (beam indication)
    o Note: The agreement implies that DCI formats 1__1 and 1__2 can be used for
      UL-only TCI state update beam indication).
    o FFS: Using DCI format 1__1 and 1__2 without DL assignment, and with a
      new acknowledgment mechanism directly in response to decoding DCI
      format 1__1 and 1__2, e.g., analogous to SPS PDSCH release
- Whether/how to support at least one additional DCI format dedicated for UL-only
  beam indication (in case of separate DL/UL), including:
    o Whether the format can also be used for DL-only beam indication (in case
      of separate DL/UL) and joint DL/UL beam indication
    o Whether it is a "brand new" format or based on some extension of the
      existing DCI formats other than 1__1 and 1__2 (e.g. 1__0, 0__0, 0__1, or 0__2)
        ■ If UL-related DCI is used, whether it is accompanied with UL grant
          or not
    o Acknowledgment mechanism
Agreement
On Rel.17 DCI-based beam indication:
- Regarding application time of the beam indication: if beam indication is received,
  down-select from the following:
    o Alt1: the first slot that is at least X ms or Y symbols after the DCI with the
      joint or separate DL/UL beam indication
    o Alt2: the first slot that is at least X ms or Y symbols after the
      acknowledgment of the joint or separate DL/UL beam indication
    o FFS: whether any existing timing defined for DCI based TCI/spatial relation
      update can be used for X/Y
- FFS: When to apply the minimum indication delay (ex: when the newly indicated
  beam is different with the previously indicated beam)
Agreement
On Rel.17 DCI-based beam indication, the beam application time is to be down-selected or
modified from the following:
- Alt1: The beam application time can be configured by the gNB based on UE
  capability
    o Support a UE capability for the minimum value of beam application time
    o FFS: the exact minimum values of beam application time supported by UE
    o FFS: whether existing UE capability can be reused as this UE capability.
    o FFS: whether different beam application time values are supported for
      uplink and downlink
    o FFS: whether UE capability needs to be introduced for the maximum value
      of beam application time
- Alt2: The beam application time is fixed and defined in specification
- Alt3: The beam application time can be configured by the gNB where the minimum
  value of beam application time is fixed and defined in specification
- Consider multi-panel UE, layer 1/2 inter-cell cases, carrier aggregation aspects In Rel-17 standard, as shown in Table 11 above, a common beam update operation for multiple UL channels/ RSs is being discussed through the joint and/or separate DL/UL TCI state.

The common beam update operation may be performed as follows. TCI state(s), in which a specific reference RS (e.g., DL/UL reference RS) is configured with QCL type-D RS or/and spatial relation information, is indicated via DCI. A transmission beam of a specific target UL channel/RS is updated to a transmission beam corresponding to the specific reference RS.

In this instance, the base station updates a transmission beam for multiple target UL channels/RSs. For a beam-specific power control behavior of the UE, when the TCI state is indicated via DCI, there is a possibility that power control (PC) related parameters (e.g., open-loop and/or closed-loop power control parameters) are indicated together.

However, as above, when the power control (PC) related parameters are configured/indicated upon the common beam update through the TCI state, the following shall be considered. Specifically, i) it is necessary to decide which PC parameter to include in the TCI state through which method upon the common beam update, and ii) coexistence between the existing power control parameters (e.g., legacy (Rel-15/ 16) PC parameter configuration) and the configuration of power control parameters delivered/indicated through the TCI state shall be considered.

The present disclosure describes a method of configuring/ indicating UL power control for a UE upon common beam update using a joint and/or separate DL/UL TCI state of a base station based on the above background, and describes a power control behavior of a subsequent UE.

In the following description, in the present disclosure, a transmission beam to be used when transmitting PUSCH/ PUCCH can be interpreted/applied as a transmission beam to be used when transmitting DMRS of PUSCH/PUCCH.

In the present disclosure, '/' can be interpreted as 'and', 'or', or 'and/or' depending on the context.

[Proposal 1]

The following describes a method of configuring/indicating a power control parameter through common beam update/indication using a joint and/or separate DL/UL TCI state.

A base station may perform power control configuration/ indication for UL channel/RS of a UE based on at least one of the following options 1 to 3.

[Option 1]

To enable perfect beam-specific PC, a joint and/or separate TCI state (for common beam update) may include all of open-loop/closed-loop PC parameter(s) (or configuration for the corresponding parameter(s)) for determining UL channel/RS transmission power. As a detailed example, the joint and/or separate TCI state may include i) all the open-loop/ closed-loop PC parameter(s) (e.g., a value of a specific parameter) or ii) configuration information for indicating all the open-loop/closed-loop PC parameter(s) (e.g., an index connected to the specific parameter, a bit value of a field representing a codepoint mapped to the specific parameter, etc.).

For example, as shown in Table 12 below, TCI-state IE may be configured. Or/and, all the open-loop/closed-loop PC parameter(s) for determining UL channel/RS transmission power may be connected/associated to a specific TCI state/TCI state ID via RRC/MAC-CE. Or/and, the PC parameter(s) configuration to be used upon the common beam update may be activated/mapped to a codepoint of a DCI specific field (e.g., TCI state field).

All the open-loop/closed-loop PC parameter(s) for determining UL channel/RS transmission power may include all or some of the following PC parameter(s).

{P0, alpha, path-loss reference RS (hereinafter, PL RS), closed-loop index}

For the above behavior, PC parameters (e.g., P0 set (or P0-Alpha set), alpha set, PL RS set and closed-loop index (s)) for the TCI state may be separately configured via RRC. For example, the PC parameters may be configured within TCI state IE. For example, the PC parameters may be defined/configured to be connected to the TCI state IE (for TCI state pool usage).

Or/and, the PC parameters may be configured via RRC in the form of a parameter set, in which all the open-loop/ closed-loop PC parameter(s) {P0, alpha, PL RS, closed-loop index} are included. Hence, the PC parameters may be configured within the TCI state IE in units of parameter set or may be connected to the TCI state IE.

Table 12 below represents an example of configuration for the TCI-state. In Table 12 below, bold marks represent newly added PC parameters compared to the existing method.

TABLE 12

| - | TCI-State |
|---|---|

The IE TCI-State associates one or two DL reference signals with a corresponding quasi-colocation (QCL) type.

TCI-State information element

```
-- ASN1START
-- TAG-TCI-STATE-START
TCI-State ::=                        SEQUENCE {
    tci-StateId                         TCI-StateId,
    qcl-Type1                           QCL-Info,
    qcl-Type2                           QCL-Info
    tci-P0-Id                           P0-Id
    tci-Alpha-Id                        Alpha-Id
    tci-PathlossReferenceRS-Id          PathlossReferenceRS-Id
    tci-ClosedLoopIndex                 ENUMERATED { i0, i1 }
    OPTIONAL,   -- Need R ...
}
QCL-Info ::=                         SEQUENCE {
    cell                                ServCellIndex
    OPTIONAL,   -- Need R
```

TABLE 12-continued

```
    bwp-Id                          BWP-Id
OPTIONAL, -- Cond CSI-RS-Indicated
    referencesignal                 CHOICE {
        csi-rs                          NZP-CSI-RS-ResourceId,
        ssb                             SSB-Index
    },
    qcl-Type                        ENUMERATED {typeA, typeB, typeC, typeD},
    ...
}
P0-set ::=                          SEQUENCE {
    p0-Id                               P0-Id
    p0                                      INTEGER (-202..24)
}
alpha-set ::=                       SEQUENCE {
    alpha-Id                            Alpha-Id
    alpha                               Alpha
}
PathlossReferenceRS ::=             SEQUENCE {
    pathlossReferenceRS-Id              PathlossReferenceRS-Id
    referenceSignal                     CHOICE {
        ssb-Index                           SSB-Index,
        csi-RS-Index                        NZP-CSI-RS-ResourceId
    }
}
-- TAG-TCI-STATE-STOP
-- ASN1STOP
```

The determination of UL channel/RS transmission power of the UE based on the Option 1 may be determined by at least one of the following two methods.

Method 1)

The following operation may be considered to determine the UL channel/RS transmission power of the UE based on the Option 1. An UL channel/RS integrated power control equation using a PC parameter set for TCI state pool usage may be separately/newly defined/configured. In relation to the UL channel/RS integrated power control equation defined according to the present embodiment, the UE may operate as below.

If a UE transmits a UL channel/RS on active UL BWP b of carrier f of serving cell c using parameter set configuration with index j and UL channel/RS power control adjustment state with index l, the UE may determine the UL channel/RS transmission power in UL channel/RS transmission occasion i based on the following Equation 7.

[Equation 7]

$$P_{TCI-state,b,f,c}(i, j, q_d, l) =$$

$$\min \begin{cases} P_{CMAX,f,c}(i) \\ P_{0,b,f,c}(j) + 10\log_{10}\left(2^{\mu} \cdot M^{UL}_{RB,b,f,c}(i)\right) + \\ \alpha_{b,f,c}(j) * PL_{b,f,c}(q_d) + f_{b,f,c}(i, l) \end{cases} \quad [\text{dBm}]$$

P0($P_{0,b,f,c}$): In the legacy behavior (a power control behavior according to the related art), P0 may be determined for PUCCH and PUSCH as follows. In a power control behavior defined per the existing channel, a value of P0 is determined by a sum of P0_nominal value and P0_pucch or P0_pusch value. However, according to the present embodiment (the Equation 7), universal P0 value instead of P0 value determined according to the existing method may be used to determine the integrated transmission power of (TCI state based) PUCCH, PUSCH, and SRS. The universal P0 value refers to P0 value configured for the integrated transmission power of UL channel/RS.

For example, the universal P0 value may be P0_nominal value (e.g., (-202 . . . 24)). Value in the P0 set (or P0-Alpha set) may be used as the universal P0 value.

alpha($\alpha_{b,f,c}$): value in the alpha set (or P0-Alpha set) may be used as the alpha value.

PL RS($PL_{b,f,c}(q_d)$): value in the PL RS set may be used as the PL RS($q_d$).

Closed-loop index($f_{b,f,c}(i,l)$): closed-loop index(s) may be 0 or 1.

In the Equation 7, weighting of a path-loss attenuation compensation ratio by the alpha value may not be performed for PUCCH. Various delta values of the power control equation of the (legacy) PUSCH and PUCCH may not be considered, or may be added to the Equation 7 based on configuration for each the existing PUCCH resource and configuration for each PUSCH.

Method 2)

The following operation may be considered to determine the UL channel/RS transmission power of the UE based on the Option 1. An equation (the Equations 3 to 5) defined for each UL channel/RS may be used (legacy power control behavior), and PC parameter(s) for TCI state pool usage may be used in an input parameter value.

That is, the power control equation defined per PUCCH, PUSCH, and SRS may be used in the legacy power control behavior (see the above-described uplink power control), and a power control parameter applied may vary depending on target channel/RS.

Specifically, when PUCCH, PUSCH, and SRS are target UL channel/RS of the common beam update by the joint and/or separate TCI state, PC parameter(s) based on the following i) or ii) may be used as an input parameter of a power control equation (the Equations 3 to 5) for each legacy UL channel/RS.

i) PC parameter(s) configured within TCI state IE (Table 12 above)

ii) Open-loop/closed-loop PC parameter(s) connected to TCI state IE

Various delta values of the power control equation of the (legacy) PUSCH and PUCCH may also be added to an equation for each UL channel/RS based on configuration for each the existing PUCCH resource and configuration for each PUSCH.

[Option 2]

A joint and/or separate TCI state (for common beam update) may include most of the PC parameter(s) (or configuration for the corresponding parameters) except for a first specific PC parameter.

Specifically, the first specific PC parameter may be based on a PC parameter that can vary for each UL channel/RS. The joint and/or separate TCI state may include remaining (or one or more) PC parameter(s) (or configuration for the corresponding parameters) except for the specific PC parameter.

Or/and, most of the PC parameter(s) except for the first specific PC parameter for determining UL channel/RS transmission power may be connected/associated to a specific TCI state/TCI state ID via RRC/MAC-CE. Or/and, the first specific PC parameter(s) configuration to be used upon the common beam update may be activated/mapped to a codepoint of a DCI specific field (e.g., TCI state field).

Most of the PC parameter(s) except for the first specific PC parameter for determining the UL channel/RS transmission power may include some or all of the following PC parameter(s).

{alpha, PL RS, [closed-loop index]}

For the above operation, PC parameter(s) (alpha set, PL RS set and [closed-loop index(s)]) for the TCI state may be separately configured via RRC. For example, the PC parameter(s) may be configured within TCI state IE. For example, the PC parameter(s) may be configured (for TCI state pool usage) so as to be connected to the TCI state IE.

Or/and, the PC parameters may be configured via RRC in the form of a parameter set, in which the open-loop/closed-loop PC parameter(s) {alpha, PL RS, [closed-loop index]} are included, and may be configured within the TCI state IE in units of a parameter set or connected to the TCI state IE.

In the Option 2, in the same manner as the method 2 of the Option 1, the power control equation for each legacy UL channel/RS may be used, and most of the PC parameter(s) for TCI state pool usage may be utilized in the input parameter value.

[Option 3]

A joint and/or separate TCI state (for common beam update) may include only second specific PC parameter(s) (or configuration for the corresponding parameters). The second specific PC parameter(s) may be based on a PC parameter that is commonly required for each UL channel/RS.

Or/and, the second specific PC parameter(s) for determining UL channel/RS transmission power may be connected/associated to a specific TCI state/TCI state ID via RRC/MAC-CE. Or/and, the second specific PC parameter(s) configuration to be used upon the common beam update may be activated/mapped to a codepoint of a DCI specific field (e.g., TCI state field).

The specific PC parameter(s) for determining the UL channel/RS transmission power may include some or all of the following PC parameter(s).

{[alpha], PL RS} and/or {closed-loop index}

For the above operation, PC parameter(s) ([alpha set], PL RS set and/or closed-loop index(s)) for the TCI state may be separately configured via RRC. For example, the PC parameter(s) may be configured within TCI state IE. For example, the PC parameter(s) may be configured (for TCI state pool usage) so as to be connected to the TCI state IE.

Or/and, the PC parameters may be configured via RRC in the form of a parameter set, in which the open-loop/closed-loop PC parameter(s) {[alpha], PL RS} and/or {closed-loop index} are included, and may be configured within the TCI state IE in units of a parameter set or connected to the TCI state IE.

In the Option 3, in the same manner as the method 2 of the Option 1, the power control equation for each legacy UL channel/RS may be used, and the second specific PC parameter(s) for TCI state pool usage may be utilized in the input parameter value.

In the proposal 1, if a specific TCI state (or a codepoint of a specific DCI field (e.g., TCI state field)) for (pre-defined/pre-configured) target UL channel/RS of the UE for Rel-17 common beam update is indicated via DCI, the UE may determine the transmission power based on the proposals of the options 1 to 3.

Specifically, the UE may perform UL beam update on the target UL channel/RS and at the same time use a PC parameter connected/configured to the corresponding TCI state (or activated/mapped to the codepoint of the specific DCI field (e.g., TCI state field)) to determine transmission power for the corresponding target UL channel/RS combination.

The target UL channel/RS combination that is a target of the beam update and/or power control may be configured/indicated prior to an indication operation (or a specific TCI state indication operation) in the above paragraph.

In the operations of the options 1 to 3, if the PC parameter within the TCI state configured/indicated to the target channel/RS using Rel-17 common beam is not configured/connected, a default PC behavior for TCI state may be configured as below.

Each parameter having a lowest value (e.g., P0 with lowest ID, alpha with lowest ID, PL RS with lowest ID, closed-loop index 0 . . . ) in the PC parameter set for the TCI state pool may be used to determine the transmission power of the target channel/RS. The default PC behavior may be used in the power control of configured-grant PUSCH.

In the operations of the options 1 to 3, Rel-17 common beam update operation may be used for simultaneous common beam update for multiple component carriers (CC) (including intra/inter-band CA). In this case, the power control behavior of the UE across the multiple CC may be performed as follows.

i) The TCI state pool may be configured for each specific frequency resource domain (e.g., CC/BWP) via RRC. The UE may use a PC parameter set configured/connected to the configured/activated/indicated TCI state in each CC/BWP as a PC input parameter of each CC/BWP. That is, the UE behavior may be interpreted as an operation when a TCI state pool is configured for each CC among the multiple CCs.

ii) The UE may use a PC parameter set configured/connected to the TCI state (of CC/BWP), that is a source of common beam update for the multiple CCs, as an integrated PC input parameter in all the target CCs. That is, the UE behavior may be interpreted as an operation when a TCI state pool that is common for the multiple CCs is configured.

The operations of the options 1 to 3 may be mixed in one UE. Specifically, the UE may operate based on one of the options 1 to 3, and may also operate based on a combination of two or more of the options 1 to 3. For example, all the PC parameters may be configured/connected to a specific TCI state (ID) as in the option 1, and the remaining PC parameters except for the first specific PC parameter may be configured/connected to another TCI state (ID) as in the option 2.

As another embodiment of the proposal 1, in the operations of the options 1 to 3, the PC parameter(s) for TCI state pool usage may be configured/connected to a TCI state group (or/and TCI state ID group) not configured/connected to a single TCI state. That is, QCL information for a common beam indication (e.g., QCL type-D RS) is configured for each single TCI state, but a power control related parameter for a common beam may be configured/connected for each TCI state group (or/and TCI state ID group). Through the above operation/configuration, a signaling overhead for common beam related power control configuration/indication of the base station can be reduced.

[Proposal 2]

The following describes a PL RS configuration/indication method using a TCI state and a subsequent UE behavior. Specifically, when a PC parameter (for TCI state pool usage) that can be configured within a (joint and/or separate) TCI state IE or can be connected to the TCI state IE includes a PL RS, a PL RS configuration/indication method and a subsequent UE behavior are described.

As described in the proposal 1, when PC parameter(s) are configured/indicated through the TCI state, P0 set (or P0-Alpha set), alpha set, PL RS set and closed-loop index(s), etc. for TCI state pool usage may be separately configured via RRC.

In particular, for the PL RS, a separate PL RS set for TCI state pool usage may be configured not the PL RS set configuration for each UL channel/RS (i.e., PUCCH, PUSCH, and SRS).

The PL RS set configuration for each UL channel/RS may include legacy RRC parameter sri-PUSCH-PathlossReferenceRS, PUCCH-PathlossReferenceRS, and pathlossReferenceRS of SRS-resourceSet IE.

Up to 64 or 128 DL RSs for path-loss measurement may be configured in the PL RS set (configured for the TCI state pool usage).

On the other hand, in Rel-17 common beam update operation, an MAC CE activation message may be used to map/connect/associate TCI states for a dynamic indication to a specific field (e.g., TCI state field) or a codepoint of DCI.

The MAC CE activation message may activate a PC parameter set for TCI state pool mentioned in the proposal 1 in a specific codepoint while mapping/connecting/associating specific TCI state(s) to the TCI state field.

That is, the PC parameter set for TCI state pool may be activated for UL channel/RS transmission based on at least one of the following i) or ii):

i) (as in the proposal 1) the PC parameter set being configured/connected to a specific TCI state, and the TCI state being activated to a specific field of DCI ii) the PC parameter set being activated to a specific field codepoint of DCI by a (TCI state) MAC CE activation message.

In particular, in the same manner, for the PL RS, i) when the PL RS is configured/connected to the activated TCI state (for a specific field of DCI), or/and ii) when the PL RS is activated to a DCI specific field by the (TCI state) MAC CE activation message, the PL RS may be considered to be activated for UL channel/RS transmission. In this instance, the UE may perform the tracking on the activated PL RS and may need to measure a path-loss attenuation compensation value.

Specifically, the PL RS activation by the i) and ii) and a tracking procedure of the UE are as below. When the PL RS is configured/connected to the specific TCI state as in the i), if the TCI state after the configuration/connection is activated to a codepoint of a DCI specific field (e.g., TCI state field) for common beam update indication usage, the UE may regard the PL RS configured/connected to the TCI state as being activated for tracking and may start performing the PL RS measurement. That is, the PL RS tracking is not performed just because the PL RS is configured/connected to the TCI state.

On the other hand, when if the PL RS is directly activated to a codepoint of a DCI specific field (TCI state field) as in the ii), the UE may regard the PL RS as being activated for tracking by the corresponding activation and start performing the PL RS measurement.

In both the i) and ii), the PL RS activation and tracking operation of the UE may be performed based on MAC activation/deactivation timeline (e.g., after 3 ms has passed from ACK transmission of the UE for the MAC CE activation message, the UE performs activation/deactivation). (Additionally) until sufficient samples are accumulated in path-loss compensation value measurement by the PL RS of the UE after the PL RS is activated as above (e.g., until 5 or more measurement samples are accumulated or/and during a specific period), the base station may impose restrictions on UL channel/RS scheduling using the corresponding PL RS.

That is, the base station may perform the UL channel/RS scheduling using the corresponding PL RS after the path-loss compensation value of the UE is sufficiently accumulated for the stable power control of the UE.

However, even if a separate PL RS set for TCI state pool usage other than a PL RS set for each UL channel/RS defined as the legacy behavior is defined/configured, there occurs a problem that the number of PL RSs simultaneously tracked by a UE on UE capability shall not exceed four (per cell). In other words, even if a PL RS set for TCI state pool usage other than the existing configured PL RS set is separately defined/configured, the maximum number of PL RSs that the UE can track cannot exceed four per cell based on the UE capability. In this regard, ambiguity related to a PL RS tracking operation within the scope of UE capability may occur.

A method for solving the above-described problem is described in detail in the following proposals 2-1/2-2/2-3.

[Proposal 2-1]

In case of a UE after Rel-17, a PL RS configured for each UL channel/RS may also be configured by taking from a PL RS pool for TCI state pool usage described in the present disclosure. That is, a PL RS for each UL channel/RS configured for the above-described legacy power control operation may also be configured based on a PL RS pool for the TCI state pool usage. In the present disclosure, the UE after Rel-17 may mean a UE supporting the above-described joint and/or separate DL/UL TCI state.

The PL RS pool for TCI state pool usage is defined/configured as a global PL RS pool. The global PL RS pool may mean a PL RS pool that is commonly used for configuration of all the PL RSs (e.g., PL RS for each UL channel/RS, PL RS for TCI state pool usage).

The global PL RS pool may be configured with up to 64 or 128 PL RSs.

A PL RS for TCI state configuration/connection usage for a common beam may be configured/connected to the TCI state among the global PL RS pool. That is, a PL RS within the global PL RS pool as the PL RS for TCI state configuration/connection usage for the common beam may be configured/connected to the TCI state (i.e., joint/separate DL/UL TCI state).

According to the existing legacy behavior, the PL RS configured/activated for each UL channel/RS (PUCCH/PUSCH/SRS) may be configured based on the following 1) to 3):

1) PL RS configured/activated to a PUCCH resource being configured from a PL RS set for PUCCH usage 2) PL RS mapped to an SRI field for PUSCH being configured from a PL RS set for PUCCH usage 3) PL RS configured to an SRS being configured from a PL RS set for SRS usage.

On the other hand, according to the present embodiment, the PL RS configured/activated for each UL channel/RS (PUCCH/PUSCH/SRS) may be configured/connected among the global PL RS pool. That is, the PL RS in the global PL RS pool may be configured as the PL RS configured/activated for each UL channel/RS (PUCCH/PUSCH/SRS).

In the UE/BS behavior related to the above-described method, a sum of the number of PL RSs according to the following a) and the number of PL RSs according to the following b) does not exceed the number according to the UE capability (per cell) (e.g., four, a specific value may vary depending on the UE capability).

a) the number of activated PL RSs (from the global PL RS pool) as in the i) and ii) of the proposal 2 for the common beam b) the number of activated PL RSs (from the global PL RS pool) in each UL channel/RS For example, the base station may configure/indicate/activate the PL RS to the UE so that the number of PL RSs according to the a) and b) does not exceed the number according to the UE capability. For example, the UE does not expect that the number of PL RSs according to the a) and b) is configured to exceed the number according to the UE capability, or may perform only an operation based on the range of the number according to the UE capability even if the number of PL RSs according to the a) and b) is configured to exceed the number according to the UE capability.

[Proposal 2-2]

A UE after the Rel-17 may manage together a PL RS pool (up to 64 PL RSs) for TCI state pool usage described in the present disclosure separately from a PL RS pool for each UL channel/RS. The PL RS pool for each UL channel/RS includes a PL RS pool defined/configured by legacy RRC parameter sri-PUSCH-PathlossReferenceRS, PUCCH-PathlossReferenceRS, and pathlossReferenceRS of SRS-resourceSet IE.

In the UE/BS behavior related to the above-described method, a sum of the number of PL RSs according to the following a) and the number of PL RSs according to the following b) does not exceed the number according to UE capability (per cell) (e.g., four, a specific value may vary depending on the UE capability).

a) the number of activated PL RSs (from the global PL RS pool) as in the i) and ii) of the proposal 2 for the common beam b) the number of activated PL RSs (from the global PL RS pool) in each UL channel/RS For example, the base station may configure/indicate/activate the PL RS to the UE so that the number of PL RSs according to the a) and b) does not exceed the number according to the UE capability. For example, the UE does not expect that the number of PL RSs according to the a) and b) is configured to exceed the number according to the UE capability, or may perform only an operation based on the range of the number according to the UE capability even if the number of PL RSs according to the a) and b) is configured to exceed the number according to the UE capability.

[Proposal 2-3]

A UE after the Rel-17 may manage together a PL RS pool (up to 64 PL RSs) for TCI state pool usage described in the present disclosure separately from a PL RS pool for each UL channel/RS. The PL RS pool for each UL channel/RS includes a PL RS pool defined/configured by legacy RRC parameter sri-PUSCH-PathlossReferenceRS, PUCCH-PathlossReferenceRS, and pathlossReferenceRS of SRS-resourceSet IE.

Unlike the proposal 2-2, in the present embodiment, the UE may report the number of PL RSs, that can be activated, with respect to each of i) PL RS for each UL channel/RS and ii) PL RS for TCI state pool usage via UE capability signaling.

Specifically, the UE may operate as follows in relation to the UE capability signaling.

1) The UE may report, to a base station, the max number of PL RSs (per cell) capable of being activated (from the PL RS pool for each legacy UL channel/RS) for each UL channel/RS (by the legacy behavior) (e.g., four, a specific value may vary depending on the UE capability).

2) Separate from the above report, the UE may report, to the base station, the max number of PL RSs (per cell) capable of being activated (from PL RS pool for TCI state pool usage) for TCI state pool usage.

The UE may transmit, to the base station, UE capability information including information on the max number of PL RSs capable of being activated from the PL RS pool for each UL channel/RS and/or the max number of PL RSs capable of being activated from the PL RS pool for TCI state pool usage.

The report of the UE about the max number of PL RSs (per cell) capable of being activated for TCI state pool usage may be performed by at least one of the following two methods.

Method 1) $Y=4$(legacy capa)+$X$(new PL RS pool capa), the UE reporting $X$ or $Y$ In the Method 1, '$X$' means the max number of PL RSs (per cell) capable of being activated for TCI state pool usage, and '$Y$' means a sum of the max number of PL RSs capable of being activated from the PL RS pool for each UL channel/RS and the max number of PL RSs (per cell) capable of being activated for TCI state pool usage.

Method 2) $Y=X1$(legacy capa)+$X2$(new PL RS pool capa), the UE reporting $X1$ and $X2$ In the Method 2, '$X1$' means the max number of PL RSs (per cell) capable of being activated from the PL RS pool for each UL channel/RS, and '$X2$' means the max number of PL RSs (per cell) capable of being activated for TCI state pool usage.

In the proposal 2, if a specific TCI state (or a codepoint of a specific DCI field (e.g., TCI state field)) for (pre-defined/pre-configured) target UL channel/RS of the UE for Rel-17 common beam update is indicated via DCI, the UE may determine the transmission power based on the proposals.

Specifically, the UE may perform UL beam update on the target UL channel/RS and at the same time may determine the transmission power using a PC parameter connected/configured to the corresponding TCI state (or activated/mapped to the codepoint of the specific DCI field (e.g., TCI state field)). The UE may calculate a path-loss compensation value based on the tracking for the activated PL RS according to the present embodiment and may determine the transmission power for the target UL channel/RS combination.

The target UL channel/RS combination that is a target of the beam update and/or power control may be configured/ indicated prior to an indication operation (i.e., a specific TCI state indication operation) in the above paragraph.

[Proposal 3]

The following describes a closed loop index configuration/indication method and a TPC command transmission method using a TCI state, and a subsequent UE behavior.

Specifically, when a PC parameter (for TCI state pool usage) that can be configured within a (joint and/or separate) TCI state IE or can be connected to the TCI state IE includes a TPC closed loop index, a closed loop index configuration/ indication method and a TPC command transmission method using the TCI state, and a subsequent UE behavior are described.

The proposal 3 describes methods applied when a TPC closed-loop index for a TCI state pool other than TPC closed-loop index(s) for each UL channel/RS is separately defined/configured. Proposal 3-1 describes a capability reporting and a UE behavior for an additional TPC loop process, and proposals 3-2-1 and 3-2-2 describe methods of how a base station dynamically indicates a TPC command for each TPC closed-loop index for TCI state pool.

[Proposal 3-1]

One or two TPC closed-loop indexes for a TCI state pool may be separately defined/configured. In this instance, the number (1 or 2) of TPC closed-loop indexes may be reported to a base station via UE capability signaling. For example, if there is no other UE report, it may be assumed that only one index is supported.

The closed-loop index for the TCI state pool may be configured/connected to a TCI state used for common beam update. For example, if the closed-loop index for the TCI state pool is not configured/connected to the TCI state used for common beam update, a value of the index may be set to zero (index 1=0).

Or/and, the closed-loop index for the TCI state pool may be activated to a codepoint of a DCI specific field (for common beam update). For example, if the closed-loop index for the TCI state pool is not activated, the corresponding codepoint may be zero (index 1=0).

That is, if the TCI state is activated for the codepoint of the DCI specific field or the closed-loop index is activated to the codepoint of the DCI specific field, the UE may regard the closed-loop index as being activated.

A base station may perform configuration/indication on an accumulated or absolute TPC command by putting a separate process in the UE for each closed-loop index. Specifically, if the accumulated TPC configuration/indication is performed on an activated closed-loop index, the UE may accumulate a TPC command of the base station while the closed-loop index is activated, and may need to maintain the accumulated TPC value. On the other hand, when (all) the closed-loop index is deactivated, the UE may flush the accumulated TPC value and perform again the TPC accumulation from 0 when the closed-loop index is activated again.

[Proposal 3-2]

The following describes a method for a base station to transmit a dynamic TPC command with respect to a TPC closed-loop index for the TCI state pool.

[Proposal 3-2-1]

With respect to transmission of the dynamic TPC command, in the present embodiment, it is assumed that UE-specific DCI (or DL/UL grant DCI) is utilized.

If a target channel scheduled by the UE-specific DCI is a target to which a common beam is applied (i.e., channel/RS belonging to the above-described target UL channel/RS combination), the UE may apply a TPC value indicated by the corresponding DCI to closed-loop index 1 activated for a target channel.

Alternatively, if the common beam update is performed even in DL/UL grant DCI, the UE may apply the TPC value to closed-loop index 1 activated for a TCI state that is a source of beam update.

On the other hand, if a target channel scheduled by the UE-specific DCI is not a target to which a common beam is applied, the UE may apply a TPC value indicated by the corresponding DCI to closed-loop index 1 for each channel/ RS based on the existing legacy TPC operation.

Based on the above-described operation, the base station can indicate a TPC command for both a legacy closed-loop index of the UE and a closed-loop index for TCI state pool via UE-specific DCI.

If only a common beam update operation is performed by the UE-specific DCI that is DCI not having DL/UL scheduling, the UE may apply the TPC value to closed-loop index 1 activated for a TCI state that is a source of beam update.

[Proposal 3-2-2]

If a base station uses Group-common (GC)-DCI, the base station may perform a TPC command indication by at least one of the following methods 1 to 3.

Method 1)

A method of establishing a new DCI format for an indication of a common beam TPC command may be considered. The base station may perform a TPC command based on target channel/RS combination configuration/indication. A target closed-loop index field may be included in a payload of the new DCI format. For example, the target closed-loop index field may be configured as follows.

target channel combination={PUSCH+SRS}, {PUCCH+ PUSCH}, {all}, or {subset of PUCCH/SRS resources}

The target channel/RS combination to which a TPC value is applied may be configured/indicated to the UE based on at least one of the following i) to iii):

i) target channel/RS to which a common beam is applied
  ii) separate configuration/activation by RRC/MAC CE signaling
  iii) target channel dynamic indication (e.g., codepoint '00'=PUSCH+SRS, '01'=PUCCH+SRS) through a specific bit field within the payload of the New GC-DCI format.

Method 2)

If a new GC-DCI format for multi-UE target common beam update is established, the base station may indicate a TPC value to the UE by including a TPC command field in a payload of the corresponding DCI. A target closed-loop index field may be included in the payload of the corresponding DCI. Even in this case, a target channel/RS combination may be pre-configured/pre-indicated in the same manner as the Method 1.

That is, the target channel/RS combination to which the TPC value is applied may be configured/indicated to the UE based on at least one of the following i) to iii):

i) target channel/RS to which a common beam is applied
  ii) separate configuration/activation by RRC/MAC CE signaling iii) target channel dynamic indication (e.g., codepoint '00'=PUSCH+SRS, '01'=PUCCH+SRS) through a specific bit field within the payload of the New GC-DCI format.

Method 3)

The base station may reuse DCI format 2_2 or DCI format 2_3 (for legacy PUSCH/PUCCH/SRS TPC indication usage) for TPC command indication and may pre-configure/pre-activate information for target channel/RS combination via RRC and/or MAC-CE.

The UE may apply a TPC command to the combined target channel/RS(s). A target closed-loop index field may be included in a payload of the corresponding DCI format. Alternatively, due to the reuse of the DCI format, the target channel/RS combination to which the TPC value is applied may be target channel/RS to which the common beam is applied.

In this case, for distinguishment from legacy TPC indication, the base station may configure a separate RNTI (e.g., TCI-TPC-RNTI) to the UE. When the UE has succeeded in decoding the DCI format 2_2 or DCI format 2_3 using the corresponding RNTI, the UE may be configured/indicated by the base station to apply the TPC value to the target channel/RS combination of the Method 3.

In the proposal 3, if a specific TCI state (or a codepoint of a specific DCI field (e.g., TCI state field)) for (pre-defined/pre-configured) target UL channel/RS of the UE for Rel-17 common beam update is indicated via DCI, the UE may determine the transmission power based on the proposal 3.

Specifically, the UE may perform UL beam update on the target UL channel/RS and at the same time use a PC parameter connected/configured to the corresponding TCI state (or activated/mapped to the codepoint of the specific DCI field (e.g., TCI state field)) to determine the transmission power. The UE may add or subtract the accumulated or absolute TPC command value indicated in the configured/connected closed-loop index according to the present embodiment to or from (open-loop based) transmission power to determine the transmission power for the target UL channel/RS combination.

The target UL channel/RS combination that is a target of the beam update and/or power control may be configured/indicated prior to an indication operation (i.e., a specific TCI state indication operation) in the above paragraph.

According to another embodiment, legacy closed-loop index (up to two indexes for PUSCH, up to two indexes for PUCCH, and up to one index for SRS) may be used as the closed-loop index for common beam.

In this instance, if a specific TCI state (or a codepoint of a specific DCI field (e.g., TCI state field)) for (pre-defined/pre-configured) target UL channel/RS of the UE for Rel-17 common beam update is indicated via DCI, the UE may operate as follows.

The UE may perform a closed-loop power control based on the (legacy) closed-loop index configured/indicated for each target UL channel/RS while performing the UL beam update on the target UL channel/RS, and apply it upon transmission of each UL channel/RS.

In addition, a TPC command indication of the base station for the (legacy) closed-loop index configured/indicated for each target UL channel/RS may utilize the proposal 3-2 (the proposal 3-2-1, and the method 1, the method 2, and the method 3 of the proposal 3-2-2).

A signaling procedure based on the above-described embodiments is described below.

An example of the UE (or base station) behavior based on at least one of the above-described embodiments (e.g., at least one of the proposals 1/2/3) is as follows. The UE (or base station) may operate based on the following 1) to 3).

1) Reception (Transmission) of Configuration Information Related to DL/UL Joint or Separate TCI (e.g., Integrated TCI Framework)

The configuration information includes a target RS/channel combination that is a target of common beam update The configuration information includes a power control configuration to be applied to the target RS/channel combination As another embodiment, the power control configuration to be applied to the target RS/channel combination may be configured/connected in units of TCI state (ID) group 2) Reception (Transmission) of a Message Indicating Update of a Beam Related to a Specific Target RS/Channel Combination (e.g., Reference RS or TCI State ID)

The message configures or indicates a power control to be applied to the specific target RS/channel combination based on at least one of the proposal 1 (the options 1 to 3), the proposal 2, and the proposal 3

3) The UE Performs Beam Update and Power Control Behavior on the Specific Target RS/Channel Combination Based on the Message The power control behavior calculates a path-loss compensation value and performs a closed-loop power control behavior based on the proposal 2 (the proposals 2-1, 2-2, and 2-3) and the proposal 3 (the proposals 3-1 and 3-2 (3-2-1 and 3-2-2))

TPC command DCI reception (transmission) based on the proposal 3 (the proposal 3-2 (3-2-1 and 3-2-2)) may precede/follow The UE/BS behavior is merely an example, and each behavior (or step) is not necessarily essential. Based on the UE/BS implementation method, the update of the transmission beam and the behavior related to power control of the UE according to the above-described embodiments may be omitted or added.

From an implementation perspective, the behaviors (e.g., the update of the transmission beam and the behavior related to power control of the UE based on at least one of the proposals 1/2/3/4) of the BS/UE according to the above-described embodiments may be processed by a device (e.g., processors 102 and 202 of FIG. 14) of FIGS. 13 to 17 to be described later.

Figure 14:
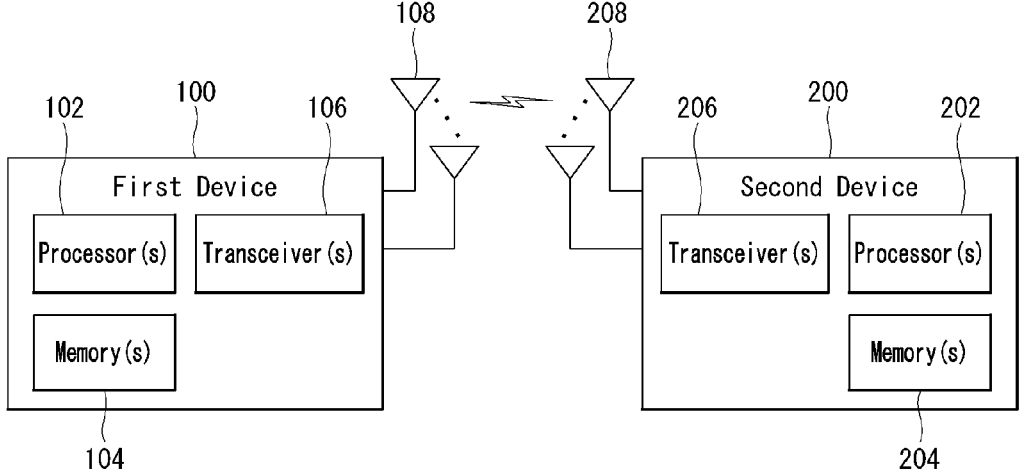
FIG. 14 illustrates wireless devices applicable to the present disclosure.

The behaviors (e.g., the update of the transmission beam and the behavior related to power control of the UE based on at least one of the proposals 1/2/3/4) of the BS/UE according to the above-described embodiments may be stored in a memory (e.g., memories 104 and 204 of FIG. 14) in the form of commands/programs (e.g., instructions, executable codes) for running at least one processor (e.g., processors 102 and 202 of FIG. 14).

Hereinafter, the above-described embodiments are described in detail from a perspective of the UE behavior with reference to FIG. 11. Methods to be described below are merely distinguished for convenience of explanation, and thus it is obvious that partial configuration of any method can be substituted or combined with partial configuration of another method.

Figure 11:
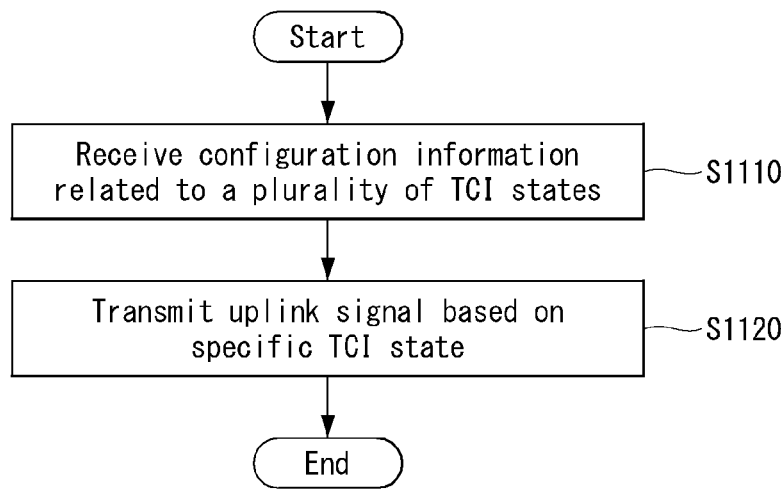
FIG. 11 is a flowchart for describing a method for a UE to transmit a UL signal in a wireless communication system according to an embodiment of the present disclosure.

FIG. 11 is a flowchart describing a method for a UE to transmit an uplink signal in a wireless communication system according to an embodiment of the present disclosure.

Referring to FIG. 11, a method for a UE to transmit an uplink signal in a wireless communication system according to an embodiment of the present disclosure comprises a step S1110 of receiving configuration information related to a plurality of TCI states and a step S1120 of transmitting an uplink signal based on a specific TCI state.

In the step S1110, the UE receives, from a base station, configuration information related to a plurality of transmission configuration indication (TCI) states.

According to an embodiment, a global PL RS pool may be configured in relation to the plurality of TCI states. The global PL RS pool may be configured based on the configuration information or configured based on a separate RRC signaling. The present embodiment may be based on the proposal 2-1.

According to an embodiment, a PL RS set may be configured in relation to the plurality of TCI states. That is, the PL RS set may be configured to be distinguished from a PL RS set configured per type of the uplink signal. In this instance, PL RS(s) used for configuring the PL RS set may be based on PL RS(s) used for the PL RS set configured per type of the uplink signal. For example, the PL RS set may be configured to include a part or all of the PL RS set configured per type of the uplink signal. For example, the PL RS set may be configured to be associated with a part or all of the PL RS set configured per type of the uplink signal. The PL RS set may be configured based on the configuration information or configured based on a separate RRC signaling. The present embodiment may be based on the proposal 2-2.

According to the step S1110, an operation of the UE (100/200 of FIGS. 13 to 17) to receive the configuration information related to the plurality of TCI states from the base station (100/200 of FIGS. 13 to 17) may be implemented by a device of FIGS. 13 to 17. For example, referring to FIG. 14, one or more processors 102 may control one or more transceivers 106 and/or one or more memories 104 so as to receive the configuration information related to the plurality of TCI states from the base station 200.

In the step S1120, the UE transmits the uplink signal to the base station based on a specific TCI state among the plurality of TCI states.

According to an embodiment, the specific TCI state may include at least one of i) a reference RS used for uplink transmission or ii) a reference RS commonly used for uplink transmission and downlink reception. The specific TCI state may be based on a joint TCI state and/or a separate TCI state in the above-described proposals 1 to 3.

A beam or a spatial filter commonly used for uplink transmission and/or downlink reception may be determined based on the specific TCI state. The uplink signal may be transmitted based on the above-described common beam. The uplink signal may be based on at least one of a physical uplink shared channel (PUSCH), a physical uplink control channel (PUCCH), or a sounding reference signal (SRS).

According to an embodiment, a transmission power of the uplink signal may be determined based on the specific TCI state. The present embodiment may be based on at least one of the proposals 1 to 3. The specific TCI state may be related to one or more power control parameters for determining the transmission power of the uplink signal.

According to an embodiment, the one or more power control parameters may include at least one of P0, alpha, a path-loss reference RS (PL RS), or a closed-loop index. The present embodiment may be based on the options 1 to 3 of the proposal 1.

According to an embodiment, a first specific power control parameter applied as a different value based on the type of the uplink signal (e.g., PUSCH/PUCCH/SRS) may be excluded from the one or more power control parameters, and the first specific power control parameter may be the P0. The present embodiment may be based on the option 2 of the proposal 1.

According to an embodiment, the one or more power control parameters may include only a second specific power control parameter equally applied based on the type of the uplink signal. The second specific power control parameter may be based on at least one of the alpha, the PL RS or the closed-loop index. The present embodiment may be based on the option 3 of the proposal 1.

According to an embodiment, the closed-loop index may be based on one or more closed-loop indexes configured in relation to the plurality of TCI states. The one or more closed-loop indexes may be different from a closed-loop index configured per type of the uplink signal. The present embodiment may be based on the proposal 3.

According to an embodiment, the number of the one or more closed-loop indexes may be determined based on a report of UE capability information representing the number of closed-loop indexes related to the plurality of TCI states. The present embodiment may be based on the proposal 3-1.

According to an embodiment, the method may further comprise a step of receiving downlink control information. Specifically, the UE may receive, from the base station, downlink control information (DCI) including a transmission power control (TPC) command. The transmission power of the uplink signal may be determined based on the one or more power control parameters and the TPC command. The TPC command may be applied based on the closed-loop index.

According to an embodiment, the transmission of the uplink signal may be performed based on a plurality of component carriers (CCs). The plurality of TCI states may be configured for each CC of the plurality of CCs. The present embodiment may be based on the proposal 1.

For example, the one or more power control parameters may be applied for power control for a specific CC related to the specific TCI state among the plurality of CCs.

For example, the one or more power control parameters may be applied for power control for the plurality of CCs. That is, the one or more power control parameters related to the specific TCI state (associated/connected to the specific CC) may be used for power control for all the CCs as well as one CC among the plurality of CCs.

According to the step S1120, an operation of the UE (100/200 of FIGS. 13 to 17) to transmit the uplink signal to the base station (100/200 of FIGS. 13 to 17) based on the specific TCI state among the plurality of TCI states may be implemented by the device of FIGS. 13 to 17. For example, referring to FIG. 14, one or more processors 102 may control one or more transceivers 106 and/or one or more memories 104 so as to transmit the uplink signal to the base station 200 based on the specific TCI state among the plurality of TCI states.

According to an embodiment, the method may further comprise a step of receiving a downlink reference signal and a step of measuring a path loss. Specifically, the UE receives a downlink reference signal (DL RS) from the base station. The UE measures a path loss based on the DL RS. In this instance, the transmission power of the uplink signal may be determined based on the one or more power control parameters and the path loss. The step of receiving the downlink reference signal and the step of measuring the path loss may be performed before the step S1110 or S1120.

According to an embodiment, the DL RS may be based on one or more PL RSs that can be maximally tracked by the UE for the purpose of the measurement of the path loss.

According to an embodiment, the global PL RS pool may be configured as described above. In this instance, the number of the one or more PL RSs may be based on i) the number of PL RSs activated per type of the uplink signal and ii) the number of PL RSs activated in relation to the plurality of TCI states. The PL RSs activated per type of the uplink signal and the PL RSs activated in relation to the plurality of TCI states may be based on the global PL RS pool. That is, all the activated PL RSs may be configured based on the global PL RS pool. The present embodiment may be based on the proposal 2-1.

According to an embodiment, as described above, a PL RS set may be configured in relation to the plurality of TCI states. The one or more PL RSs may be related to at least one of i) a PL RS set configured per type of the uplink signal or ii) a PL RS set configured in relation to the plurality of TCI states. The present embodiment may be based on the proposal 2-2.

According to an embodiment, the method may further comprise a step of transmitting UE capability information. Specifically, the UE may transmit, to the base station, UE capability information including information related to the maximum number of PL RSs that can be tracked by the UE for the purpose of the measurement of the path loss. The present embodiment may be based on the proposal 2-3.

The information related to the maximum number of PL RSs may include information for at least one of i) the maximum number of PL RSs capable of being activated based on a PL RS set configured per type of the uplink signal, ii) the maximum number of PL RSs capable of being activated based on a PL RS set configured in relation to the plurality of TCI states, or iii) a sum of the maximum number of PL RSs according to the i) and the maximum number of PL RSs according to the ii).

Hereinafter, the above-described embodiments are described in detail from a perspective of the base station behavior with reference to FIG. 12. Methods to be described below are merely distinguished for convenience of explanation, and thus it is obvious that partial configuration of any method can be substituted or combined with partial configuration of another method.

Figure 12:
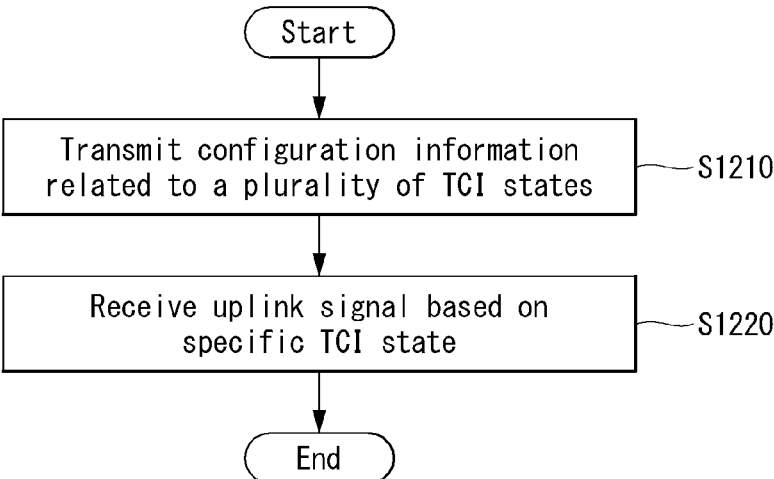
FIG. 12 is a flowchart for describing a method for a BS to receive a UL signal in a wireless communication system according to another embodiment of the present disclosure.

FIG. 12 is a flowchart describing a method for a base station to receive an uplink signal in a wireless communication system according to another embodiment of the present disclosure.

Referring to FIG. 12, a method for a base station to receive an uplink signal in a wireless communication system according to another embodiment of the present disclosure comprises a step S1210 of transmitting configuration information related to a plurality of TCI states and a step S1220 of receiving an uplink signal based on a specific TCI state.

In the step S1210, the base station transmits, to a UE, configuration information related to a plurality of transmission configuration indication (TCI) states.

According to an embodiment, a global PL RS pool may be configured in relation to the plurality of TCI states. The global PL RS pool may be configured based on the configuration information or configured based on a separate RRC signaling. The present embodiment may be based on the proposal 2-1.

According to an embodiment, a PL RS set may be configured in relation to the plurality of TCI states. That is, the PL RS set may be configured to be distinguished from a PL RS set configured per type of the uplink signal. In this instance, PL RS(s) used for configuring the PL RS set may be based on PL RS(s) used for the PL RS set configured per type of the uplink signal. For example, the PL RS set may be configured to include a part or all of the PL RS set configured per type of the uplink signal. For example, the PL RS set may be configured to be associated with a part or all of the PL RS set configured per type of the uplink signal. The PL RS set may be configured based on the configuration information or configured based on a separate RRC signaling. The present embodiment may be based on the proposal 2-2.

According to the step S1210, an operation of the base station (100/200 of FIGS. 13 to 17) to transmit the configuration information related to the plurality of TCI states to the UE (100/200 of FIGS. 13 to 17) may be implemented by a device of FIGS. 13 to 17. For example, referring to FIG. 14, one or more processors 202 may control one or more transceivers 206 and/or one or more memories 204 so as to transmit the configuration information related to the plurality of TCI states to the UE 100.

In the step S1220, the base station receives the uplink signal from the UE based on a specific TCI state among the plurality of TCI states.

According to an embodiment, the specific TCI state may include at least one of i) a reference RS used for uplink reception or ii) a reference RS commonly used for uplink reception and downlink transmission. The specific TCI state may be based on a joint TCI state and/or a separate TCI state in the above-described proposals 1 to 3.

A beam or a spatial filter commonly used for uplink reception and/or downlink transmission may be determined based on the specific TCI state. The uplink signal may be received based on the above-described common beam. The uplink signal may be based on at least one of a physical uplink shared channel (PUSCH), a physical uplink control channel (PUCCH), or a sounding reference signal (SRS).

According to an embodiment, a transmission power of the uplink signal may be determined based on the specific TCI state. The present embodiment may be based on at least one of the proposals 1 to 3. The specific TCI state may be related to one or more power control parameters for determining the transmission power of the uplink signal.

According to an embodiment, the one or more power control parameters may include at least one of P0, alpha, a path-loss reference RS (PL RS), or a closed-loop index. The present embodiment may be based on the options 1 to 3 of the proposal 1.

According to an embodiment, a first specific power control parameter applied as a different value based on the type of the uplink signal (e.g., PUSCH/PUCCH/SRS) may be excluded from the one or more power control parameters, and the first specific power control parameter may be the P0. The present embodiment may be based on the option 2 of the proposal 1.

According to an embodiment, the one or more power control parameters may include only a second specific power control parameter equally applied based on the type of the uplink signal. The second specific power control parameter may be based on at least one of the alpha, the PL RS or the closed-loop index. The present embodiment may be based on the option 3 of the proposal 1.

According to an embodiment, the closed-loop index may be based on one or more closed-loop indexes configured in relation to the plurality of TCI states. The one or more closed-loop indexes may be different from a closed-loop index configured per type of the uplink signal. The present embodiment may be based on the proposal 3.

According to an embodiment, the number of the one or more closed-loop indexes may be determined based on a report of UE capability information representing the number of closed-loop indexes related to the plurality of TCI states. The present embodiment may be based on the proposal 3-1.

According to an embodiment, the method may further comprise a step of transmitting downlink control information. Specifically, the base station may transmit, to the UE, downlink control information (DCI) including a transmission power control (TPC) command. The transmission power of the uplink signal may be determined based on the one or more power control parameters and the TPC command. The TPC command may be applied based on the closed-loop index.

According to an embodiment, the reception of the uplink signal may be performed based on a plurality of component carriers (CCs). The plurality of TCI states may be configured for each CC of the plurality of CCs. The present embodiment may be based on the proposal 1.

For example, the one or more power control parameters may be applied for power control for a specific CC related to the specific TCI state among the plurality of CCs.

For example, the one or more power control parameters may be applied for power control for the plurality of CCs. That is, the one or more power control parameters related to the specific TCI state (associated/connected to the specific CC) may be used for power control for all the CCs as well as one CC among the plurality of CCs.

According to the step S1220, an operation of the base station (100/200 of FIGS. 13 to 17) to receive the uplink signal from the UE (100/200 of FIGS. 13 to 17) based on the specific TCI state among the plurality of TCI states may be implemented by the device of FIGS. 13 to 17. For example, referring to FIG. 14, one or more processors 202 may control one or more transceivers 206 and/or one or more memories 204 so as to receive the uplink signal from the UE 100 based on the specific TCI state among the plurality of TCI states.

According to an embodiment, the method may further comprise a step of transmitting a downlink reference signal. Specifically, the base station transmits a downlink reference signal (DL RS) to the UE. The UE measures a path loss based on the DL RS. The transmission power of the uplink signal may be determined based on the one or more power control parameters and the path loss. The step of transmitting the downlink reference signal may be performed before the step S1210 or S1220.

According to an embodiment, the DL RS may be based on one or more PL RSs that can be maximally tracked by the UE for the purpose of the measurement of the path loss.

According to an embodiment, the global PL RS pool may be configured as described above. In this instance, the number of the one or more PL RSs may be based on i) the number of PL RSs activated per type of the uplink signal and ii) the number of PL RSs activated in relation to the plurality of TCI states. The PL RSs activated per type of the uplink signal and the PL RSs activated in relation to the plurality of TCI states may be based on the global PL RS pool. That is, all the activated PL RSs may be configured based on the global PL RS pool. The present embodiment may be based on the proposal 2-1.

According to an embodiment, as described above, a PL RS set may be configured in relation to the plurality of TCI states. The one or more PL RSs may be related to at least one of i) a PL RS set configured per type of the uplink signal or ii) a PL RS set configured in relation to the plurality of TCI states. The present embodiment may be based on the proposal 2-2.

According to an embodiment, the method may further comprise a step of receiving UE capability information. Specifically, the base station may receive, from the UE, UE capability information including information related to the maximum number of PL RSs that can be tracked by the UE for the purpose of the measurement of the path loss. The present embodiment may be based on the proposal 2-3.

The information related to the maximum number of PL RSs may include information for at least one of i) the maximum number of PL RSs capable of being activated based on a PL RS set configured per type of the uplink signal, ii) the maximum number of PL RSs capable of being activated based on a PL RS set configured in relation to the plurality of TCI states, or iii) a sum of the maximum number of PL RSs according to the i) and the maximum number of PL RSs according to the ii).

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
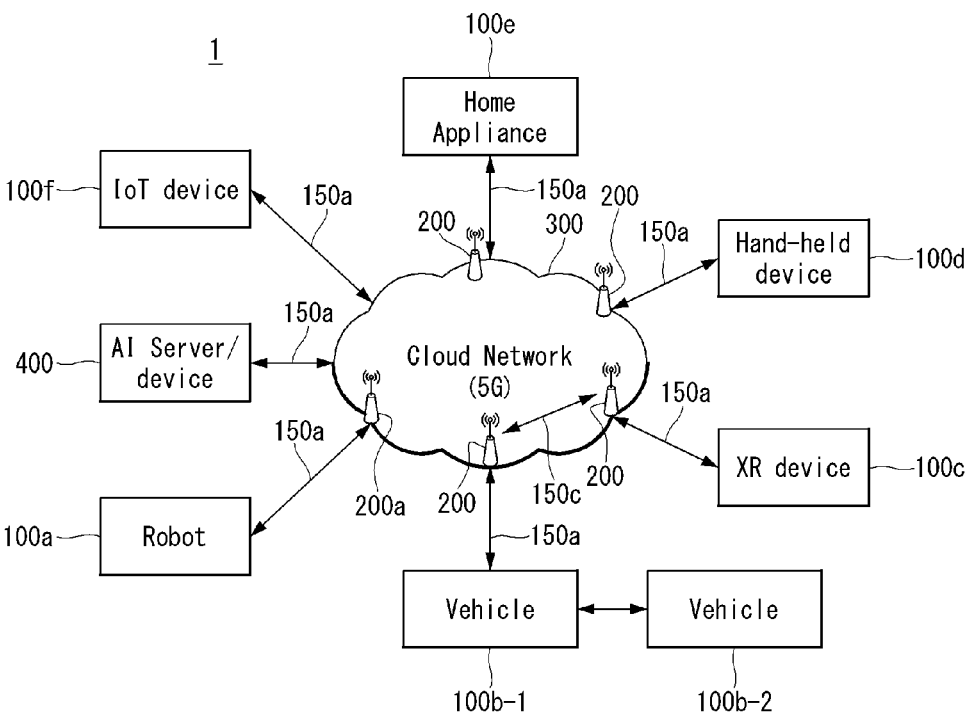
FIG. 13 illustrates a communication system 1 applied to the present disclosure.

FIG. 13 illustrates a communication system 1 applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108.

Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

Figures 15, 16:
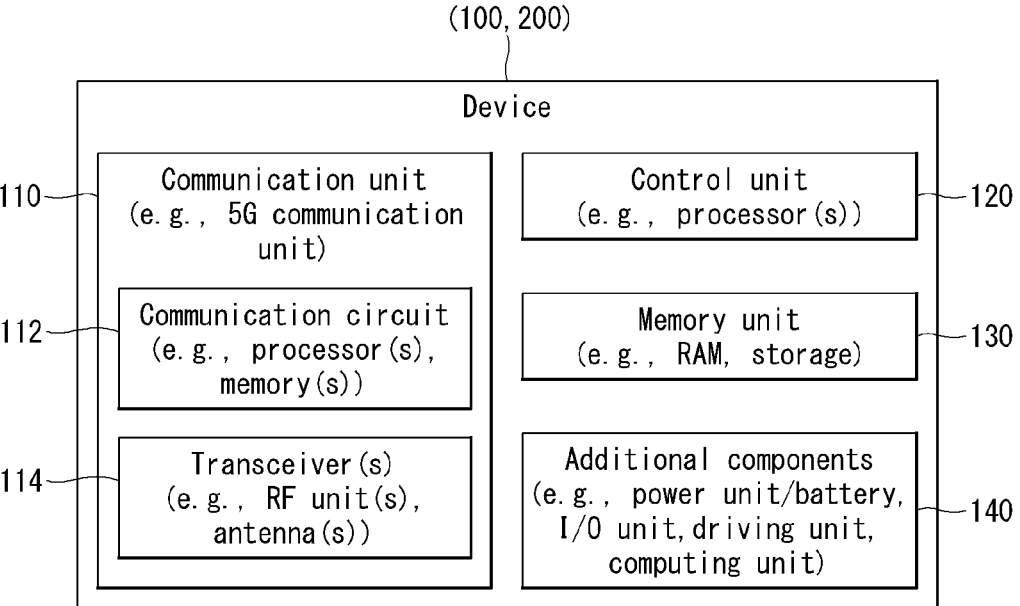
FIG. 15 illustrates a signal process circuit for a transmission signal.
FIG. 16 illustrates another example of a wireless device applied to the present disclosure.

FIG. 15 illustrates a signal process circuit for a transmission signal.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 16 illustrates another example of a wireless device applied to the present disclosure.

The wireless device may be implemented in various forms according to a use-case/service (refer to FIG. 13). Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/ device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 17 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/ signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140*c*.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method comprising:
transmitting, by a user equipment (UE), UE capability information including information related to a maximum number of PathLoss reference RSs (PL RSs);
receiving, by the UE, configuration information related to a plurality of transmission configuration indication (TCI) states;
receiving, by the UE, a downlink reference signal (DL RS);
measuring, by the UE, a pathloss based on the DL RS; and
transmitting, by the UE, an uplink signal based on a specific TCI state among the plurality of TCI states, wherein the specific TCI state is i) an UL TCI state including information related to a reference signal for an UL Tx spatial filter or ii) a joint TCI state including information related to a reference signal for the UL Tx spatial filter and a quasi-colocation (QCL),
wherein the specific TCI state is related to one or more power control parameters among a plurality of power control parameters for determining a transmission power of the uplink signal,
wherein the transmission power of the uplink signal is determined based on the one or more power control parameters and the pathloss,
wherein the DL RS is based on the PL RSs that can be maximally tracked by the UE for the measurement of the pathloss,
wherein the information related to the maximum number of the PL RSs includes information for a maximum number of PL RSs capable of being activated based on a PL RS set configured in relation to the plurality of TCI states.

2. The method of claim 1, wherein the plurality of power control parameters include P0, alpha, an index of a PL RS and a closed-loop index.

3. The method of claim 2, wherein, among the plurality of power control parameters, i) at least one first power control parameter is configured separately for each of a Physical Uplink Shared Channel (PUSCH), a Physical Uplink Control Channel (PUCCH) and a Sounding Reference Signal (SRS), and ii) at least one second power control parameter is configured for the PUSCH, the PUCCH and the SRS,
wherein the at least one first power control parameter includes at least one of the P0, the alpha and/or the closed-loop index, and the at least one second power control parameter includes the index of the PL RS.

4. The method of claim 3, wherein the specific TCI state includes the index of the PL RS only.

5. The method of claim 2, wherein the closed-loop index is based on one or more closed-loop indexes configured in relation to the plurality of TCI states, and
wherein the one or more closed-loop indexes are different from a closed-loop index configured per type of the uplink signal.

6. The method of claim 5, wherein a number of the one or more closed-loop indexes is determined based on a report of UE capability information representing a number of closed-loop indexes related to the plurality of TCI states.

7. The method of claim 5, further comprising:
receiving downlink control information (DCI) including a transmission power control (TPC) command,
wherein the transmission power of the uplink signal is determined based on the one or more power control parameters and the TPC command, and
wherein the TPC command is applied based on the closed-loop index.

8. The method of claim 1, wherein the transmission of the uplink signal is performed based on a plurality of component carriers (CCs), and
wherein the plurality of TCI states are configured for each CC of the plurality of CCs.

9. The method of claim 8, wherein the one or more power control parameters are applied for power control for a specific CC related to the specific TCI state among the plurality of CCs.

10. The method of claim 8, wherein the one or more power control parameters are applied for power control for the plurality of CCs.

67

11. A user equipment (UE) comprising:

one or more transceivers;

one or more processors; and one or more memories operably connectable to the one or more processors, wherein the one or more memories are configured to store instructions that allow the one or more processors to perform operations based on being executed by the one or more processors, wherein the operations comprise:

transmitting UE capability information including information related to a maximum number of PathLoss reference RSs (PL RSs);

receiving configuration information related to a plurality of transmission configuration indication (TCI) states;

receiving a downlink reference signal (DL RS);

measuring a pathloss based on the DL RS; and transmitting an uplink signal based on a specific TCI state among the plurality of TCI states, wherein the specific TCI state is i) an UL TCI state including information related to a reference signal for an UL Tx spatial filter or ii) a joint TCI state including information related to a reference signal for the UL Tx spatial filter and a quasi-colocation (QCL), wherein the specific TCI state is related to one or more power control parameters among a plurality of power control parameters for determining a transmission power of the uplink signal, wherein the transmission power of the uplink signal is determined based on the one or more power control parameters and the pathloss, wherein the DL RS is based on the PL RSs that can be maximally tracked by the UE for the measurement of the pathloss, wherein the information related to the maximum number of the PL RSs includes information for a maximum number of PL RSs capable of being activated based on a PL RS set configured in relation to the plurality of TCI states.

68

12. A base station comprising:

one or more transceivers;

one or more processors; and one or more memories operably connectable to the one or more processors, wherein the one or more memories are configured to store instructions that allow the one or more processors to perform operations based on being executed by the one or more processors, wherein the operations comprise:

receiving, from a user equipment (UE), UE capability information including information related to a maximum number of PathLoss reference RSs (PL RSs);

transmitting, to the UE, configuration information related to a plurality of transmission configuration indication (TCI) states;

transmitting, to the UE, a downlink reference signal (DL RS); and receiving, from the UE, an uplink signal based on a specific TCI state among the plurality of TCI states, wherein the specific TCI state is i) an UL TCI state including information related to a reference signal for an UL Tx spatial filter or ii) a joint TCI state including information related to a reference signal for the UL Tx spatial filter and a quasi-colocation (QCL), wherein the specific TCI state is related to one or more power control parameters among a plurality of power control parameters for determining a transmission power of the uplink signal, wherein the transmission power of the uplink signal is determined based on the one or more power control parameters and a pathloss which is measured based on the DL RS, wherein the DL RS is based on the PL RSs that can be maximally tracked by the UE for the measurement of the pathloss, wherein the information related to the maximum number of the PL RSs includes information for a maximum number of PL RSs capable of being activated based on a PL RS set configured in relation to the plurality of TCI states.

* * * * *